United States Patent
Harumoto et al.

(10) Patent No.: US 6,754,276 B1
(45) Date of Patent: Jun. 22, 2004

(54) SYSTEM STREAM CREATING APPARATUS WHICH ADJUSTS SYSTEM CLOCK REFERENCE BASED ON TOTAL NUMBER OF PICTURES TO BE STORED AND DECODED DURING CERTAIN TIME PERIOD

(75) Inventors: Hideaki Harumoto, Moriguchi (JP); Tomoyuki Okada, Edinburgh (GB); Kojiro Kawasaki, Hirakata (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 700 days.

(21) Appl. No.: 09/666,102

(22) Filed: Sep. 20, 2000

(30) Foreign Application Priority Data

Sep. 20, 1999 (JP) ............................................ 11-265573

(51) Int. Cl.[7] ................................................ H04N 7/12
(52) U.S. Cl. .............. 375/240.26; 375/240; 375/240.01
(58) Field of Search ........................ 375/240.26, 240.12, 375/240, 240.01, 240.02, 240.04; 386/109, 85

(56) References Cited

U.S. PATENT DOCUMENTS

| 5,231,484 A | * | 7/1993 | Gonzales et al. ...... 375/240.04 |
| 5,612,788 A | * | 3/1997 | Stone ........................... 386/85 |
| 6,167,084 A | * | 12/2000 | Wang et al. ............ 375/240.02 |
| 6,438,317 B1 | * | 8/2002 | Imahashi et al. ............ 386/109 |

* cited by examiner

Primary Examiner—Christopher Kelley
Assistant Examiner—Allen Wong
(74) Attorney, Agent, or Firm—Wenderoth, Lind & Ponack, L.L.P.

(57) ABSTRACT

A system stream creating apparatus including: a stream data transfer unit for extracting a piece of picture data having a size of a payload from the video stream data and storing it into a fixed-length pack; a header data generating unit for writing a system clock reference (SCR) in a pack header; a condition judging unit for judging, when the SCR is written, whether a difference between (1) a total number of pieces of picture data to be stored in the video decoder buffer up to the SCR and (2) a total number of pieces of picture data to be decoded by the decoding apparatus up to a unit time before the SCR has reached a predetermined value; and a stop/resume control unit for, when the judgement is positive, causing the header data generating unit not to write the SCR and causing the stream data transfer unit to stop storing the piece of video stream data, and after having done these, causing a time updating unit to update the SCR then causing the condition judging unit to judge, and when the judgement is negative, causing the header data generating unit to write the SCR and causing the stream data transfer unit to resume storing the piece of video stream data.

15 Claims, 21 Drawing Sheets

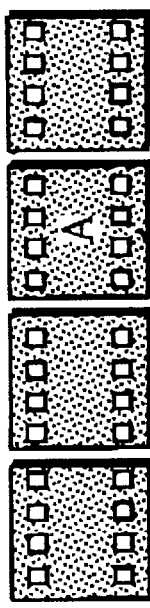
FIG. 3A
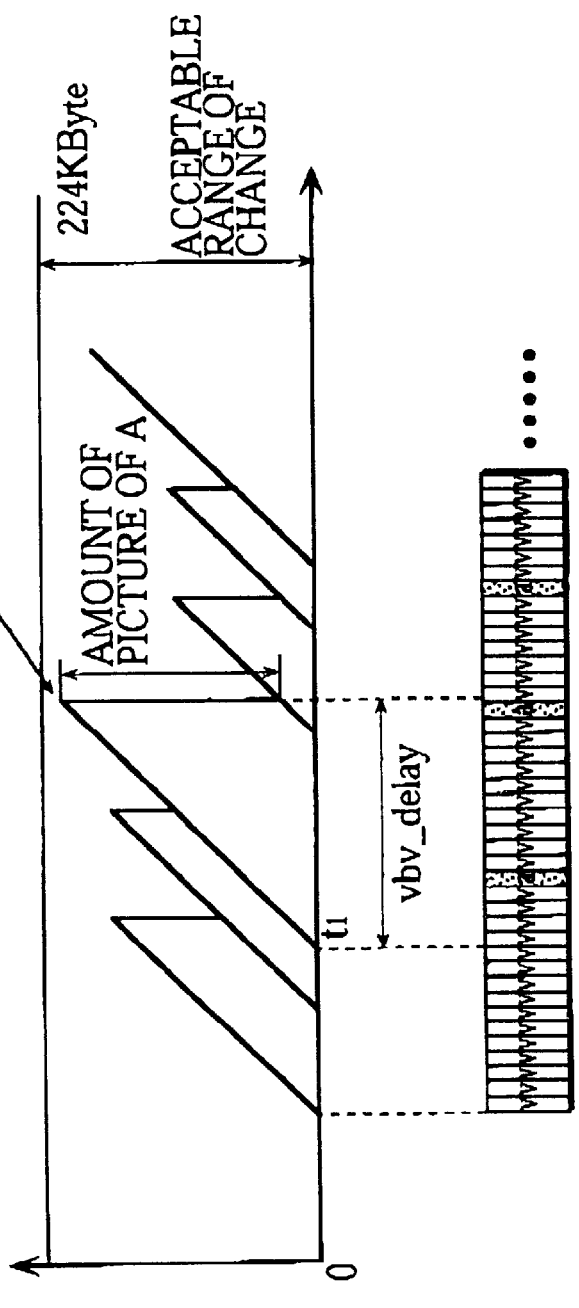
FIG. 3B
FIG. 3C
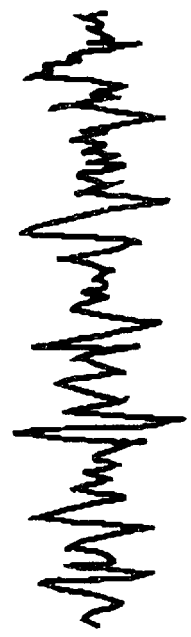
FIG. 3D

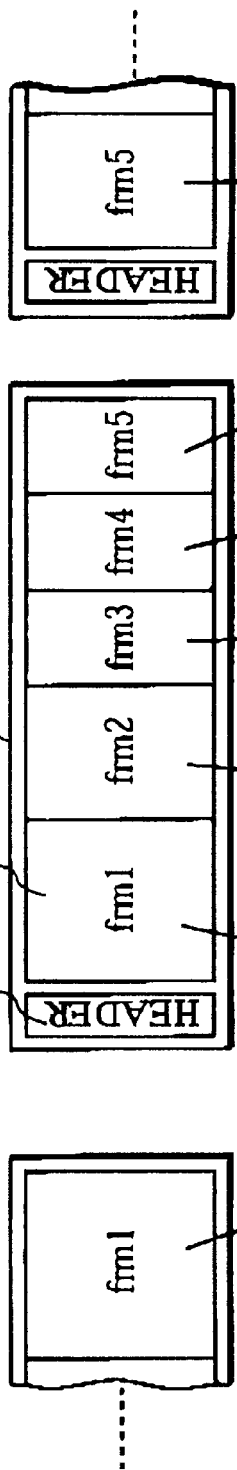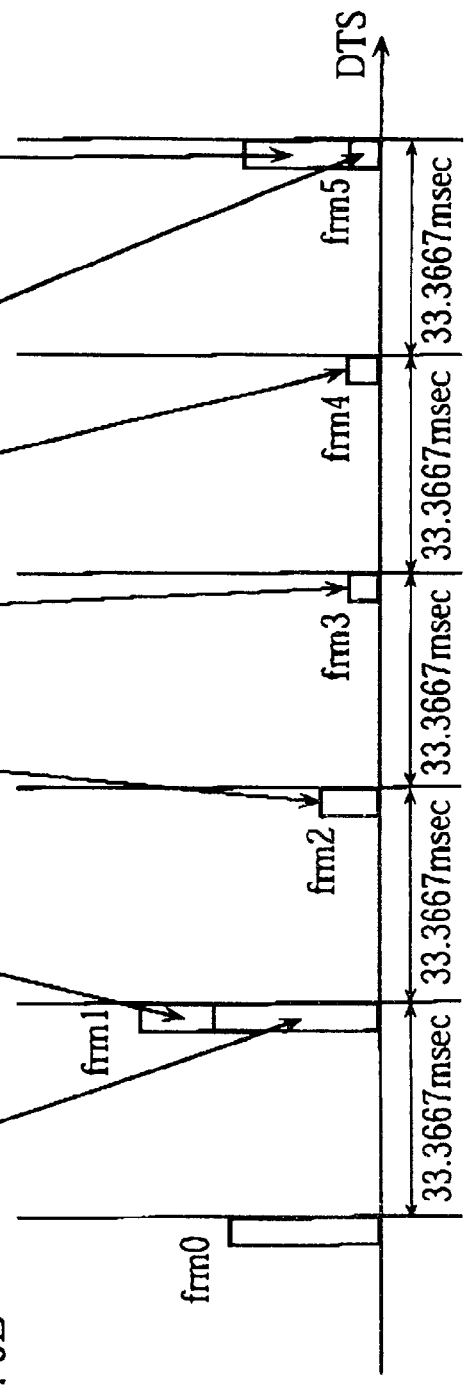
FIG. 9A
FIG. 9B

SYSTEM STREAM CREATING APPARATUS WHICH ADJUSTS SYSTEM CLOCK REFERENCE BASED ON TOTAL NUMBER OF PICTURES TO BE STORED AND DECODED DURING CERTAIN TIME PERIOD

BACKGROUND OF THE INVENTION (1) Field of the Invention

The present invention relates to a system stream creating apparatus for creating a system stream from a video stream and an audio stream which have been generated in accordance with the MPEG standard. More particularly, the present invention relates to a system stream creating apparatus for creating a system stream which easily conforms to the MPEG standard and the DVD standard and to a DVD recorder having the system stream creating apparatus.

(2) Description of Related Art

Recently, DVD-RAM, a phase-change type optical disc having a capacity of several giga bytes, has come on the market. It is expected that the DVD-RAM will be used as a recording/reproducing medium not only for computers but for other commercial products. This expectation has been enhanced as MPEG (MPEG2), a standard for encoding the digital audiovisual (hereinafter referred to as AV) data, has become commercially practical.

MPEG

The AV data recorded on the DVD-RAM conforms to an international standard called MPEG (ISO/IEC13818). The capacity of the DVD-RAM, though several gigabytes, is not enough to record uncompressed digital AV data. The AV data is therefore recorded after it is compressed. The MPEG standard is prevalent as a method for compressing AV data. Thanks to the recent progress in the LSI circuit technology, MPEG codec (compression/decompression LSI) has come into practical use. This has made it possible for DVD recorders to compress/decompress digital data in accordance with the MPEG standard.

MPEG has the following two main characteristics for achieving highly efficient data compression.

The first characteristic is that MPEG compresses moving-image data using the time correlation characteristic found between frames as well as the spacial frequency characteristic which has been used conventionally. For data compression in MPEG, each frame (in MPEG, also referred to as Picture) is classified into I-Picture (Intra-Coded Picture), P-Picture (Predictive-Coded Picture which uses the I-Picture and reference to past), and B-Picture (Bidirectionally Predictive-Coded Picture which uses the I-Picture and reference to past and future).

To achieve trick plays such as fast-forward, rewinding, and a reproduction from any desired point when reproducing data stored in a storage medium, MPEG defines GOP (Group Of Pictures). This is because in MPEG, frames do not complete in themselves and as described above, video data is encoded based on prediction using past and future frames. As a result, frames are divided into groups of Pictures, the groups being called GOPs which each include at least one I-Picture. With such a construction, random access is available.

The second characteristic of MPEG is that the amount of coding is assigned dynamically in units of Pictures in proportionate to the complexity of images. In MPEG, the decoder includes an input buffer in which data is stored beforehand. This construction enables complicated images to be assigned a great amount of coding.

The audio data for DVD-RAM is compressed with one method: MPEG audio or Dolby digital (AC-3) for compressing data, or LPCM not for compressing data. The Dolby digital and the LPCM use fixed bit rates. The MPEG audio uses a variable bit rate in which audio frames are generated in fixed synchronization, with different sizes.

The AV data is multiplexed into one stream with the "MPEG system" method. FIG. 1 shows the construction of the MPEG system. In the drawing, "21" represents a pack header, "22" a packet header, and "23" a payload. The MPEG system has a hierarchical structure including packs and packets. Each packet is composed of a packet header 22 and a payload 23. The AV data is divided into portions of an appropriate size from the start of the AV data. The payload 23 stores a piece of divided data. The packet header 22 includes a stream ID, DTS (Decoding Time Stamp), and PTS (Presentation Time Stamp) as information of the AV data stored in the payload 23. The stream ID is used to identify the AV data stored in the payload 23. The DTS indicates a time when the AV data stored in the payload 23 is decoded and is represented with accuracy of 90 kHz. It should be noted here that the packet header 22 does not include DTS when, for example, audio data is decoded and presented at the same time. The pack is a unit including a plurality of packets. In DVD-RAM, one packet is used as one pack. Therefore, each pack is composed of a pack header 21 and a packet (composed of a packet header 22 and a payload 23). In the pack header, SCR (System Clock Reference) is recorded. The SCR indicates a time when the AV data stored in the pack is input into the decoder buffer, with accuracy of 27 MHz. For DVD-RAM, the types of the packets are determined in accordance with the type of the stream the DVD-RAM stores. The packet types are, for example, the video stream packet for storing MPEG video data, the audio stream packet for storing MPEG audio data, the private stream 2 packet for storing Dolby AC-3 audio data, and the padding stream packet for storing dummy data which is discarded by the demultiplexer during decoding.

The DVD-ROM records such an MPEG system stream so that one pack has one sector (=2,048 bytes).

Now, the decoder for decoding the above MPEG system stream will be described. FIG. 2 shows a decoder model (P-STD) for the MPEG system decoder. The decoder includes STC (System Time Clock) 31 which clocks the standard time in the decoder, a demultiplexer 32 which decodes and demultiplexes the system stream, a video buffer 33 for a video decoder, the video decoder 34, a re-order buffer 35 which temporarily stores the I- and P-Pictures for the purpose of rearranging the I-, P-, and B-Pictures for presentation, a switch 36 which adjusts the output order of the I-, P-, and B-Pictures stored in the reorder buffer, an audio buffer 37 for an audio decoder, and the audio decoder 38.

The MPEG system decoder with the above construction processes the MPEG system stream as follows. When the time of the STC 31 matches the SCR written in the pack header in a pack, the demultiplexer 32 inputs the pack. The demultiplexer 32 decodes the stream ID of the packet header, and transfers the data in the payload to the decode buffer corresponding to the stream. The demultiplexer 32 also extracts the PTS and. DTS from the packet header. The video decoder 34 extracts Picture data from the video buffer 33 when the time of the STC 31 matches the DTS, decodes the Picture data, stores the I- and P- Pictures in the re-order buffer 35, and outputs the B-Pictures for presentation. The switch 36 is positioned on the side of the re-order buffer 35 when the video decoder 34 decodes an I- or P-Picture, and on the side of the video decoder 34 when the video decoder 34 decodes a B-Picture. The audio decoder 38 extracts data of one audio frame from the audio buffer 37 when the time of the STC 31 matches the PTS (for audio data, there is no DTS) and decodes the extracted data.

For MPEG, "0x00" (in this document, "0x" indicates that the succeeding numerals represent a hexadecimal value) has special meaning. Every meaningful group of data in MPEG begins with a 4-byte identification code. For example, the pack header begins with a 4-byte code, "0x000001BA", the GOP "0x000001B8", and the Picture "0x00000100". "0x00" is referred to as "next start code" since a sequence of two "next start codes" and one "0x01" indicates the start of a meaningful group of data. In MPEG, there is no limit to the number of successive "next start codes", but when "0x01" is found, the position two next start codes before the "0x01" is recognized as the start of the meaningful group of data. The "next start codes" before these codes are skipped by the decoder during reproduction.

Now, a method of multiplexing data into the MPEG system stream will be described with reference to FIGS. 3A to 3D. FIG. 3A shows a video frame. FIG 3B shows a video buffer. FIG. 3C shows an MPEG system stream. FIG. 3D shows audio data. The horizontal axis shows a time axis which is common to the drawings. The vertical axis in FIG. 3B indicates amount of buffer occupation (amount of data stored in the video buffer). The thick solid line shows the change in the amount of buffer occupation over time. The amount of tilt of the thick solid line is proportionate to the video bit rate. The line shows that data is input to the buffer at a certain rate. The reduction in the amount of buffer occupation happening at intervals shows that data has been decoded. The points of intersections of slant break lines and the time axis indicate the data transfer start times when video frames start to be transferred to the video buffer.

The following is an explanation using a complicated image A as an example. As shown in FIG. 3B, since the image A requires a great amount of encoding, the data starts to be transferred to the video buffer at time t1 before the decoding time. The period between the data input start time t1 and the decoding time is referred to as "vbv_delay". According to the standard for DVD-RAM, to ensure the normal operation of the decoder during reproduction, the amount of Pictures generated by the video encoder and timing with which the system encoder multiplexes should be controlled so that the change of the amount of data in the video buffer shown in FIGS. 3A to 3D ranges 0 to 224 KB. The audio data needs not be transferred as earlier as the video data since it does not require such a dynamic control of the amount of encoding. As a result, it is typical that the audio data is multiplexed a little earlier than the decoding time. Accordingly, among the video data and the audio data to be presented at the same time, the video data starts to be multiplexed earlier than the audio data. In MPEG, a time period during which data is stored in the buffer is defined. According to the definition, all data except for still picture data should be output from the buffer to the decoder in one second after the data is input to the buffer (this definition is called "one-second rule"). As a result, the difference between the video data and the audio data at multiplexing is one second at most (strictly speaking, the difference may be larger than this when the difference with the reorder buffer for the video data is added).

The basic idea of causing the system encoder to store the video data into the packs and inserting the SCRs will be described with reference to FIGS. 4A and 4B. As shown in FIG. 4B, the system stream is composed of a plurality of packs 510. SCR is written in each pack header 511. The system stream has a predetermined value called multiplexing rate Mx. This indicates that the pack 510 is input to the demultiplexor 509 of the decoder at the bit rate of Mx. The multiplexing rate Mx corresponds to the transfer speed on the belt conveyor 501 in the example shown in FIG. 4A. Similarly, the packs correpond to the boxes on the belt conveyor 501, and the video data to the load 503 packed in the box 502. The system encoder 504 adjusts the amount of the video data (=load 503) to be packed in the box 502 and also adjusts the timing with which the box 502 is put on the belt conveyor 501, based on the amount of video data generated by the video encoder 505. The timing adjustment corresponds to the decision of the SCR value. This is because the demultiplexor 509 takes out the load 503 (=video data) from the box 502 the instant STC matches SCR after the box reaches the decoder 506. The extracted video data is temporarily stored in the video buffer 507. When the video encoder 505 generates a large number of Pictures, the boxes 502 having the loads 503 are sequentially put on the belt conveyor 501 with little spaces in between. In contrast, when the video encoder 505 generates a small number of Pictures, a small number of boxes 502 are put on the belt conveyor, or in some cases, a plurality of loads (=frames) are packed in each box. Also, a cushioning material may be packed in the box to fill in the space. The cushioning material corresponds to dummy data. The video data stored in the video buffer 507 is decoded based on DTS written in the packet header 512. As a result, data stored in the video buffer 507 reduces by the Picture size. The basics of the video multiplexing performed by the system encoder is to determine the values of SCR (=the timing with which boxes 502 are transmitted), the amount of video data (=load 503 to be packed in the box), and the amount of dummy data (=cushioning material) so that the amount of data stored in the video buffer 507 does not exceed an upper limit or so that the video buffer 507 becomes empty during a time period between an arrival and a consumption of data, and so that the aforesaid one-second rule is not violated.

Logical Construction of DVD-RAM

Now, the logical construction of DVD-RAM will be described with reference to FIG. 5. The DVD recorder deals with two major files: one management information file; and one or more AV files.

Management Information File

The contents of the management information file will be described with reference to FIG. 6A, using mainly the management information file for video.

The management information file includes two major tables: VOBI (VOB Information) table; and PSGI (PSG Information) table. The VOB is an MPEG program stream. The PSG defines the presentation order of "cells" for which an arbitrary portion or all portions of a VOB are a logical presentation unit. In other words, VOB is a unit of MPEG data, and PSG is a unit used when a player performs presentation.

As shown in FIG. 6A, the VOBI table records the number_of_VOBIs and VOBIs. Each VOBI includes VOB_Type (type of VOB), VOB_Start_PTM (presentation start time), VOB_End_PTM (presentation end time), VOB_REC_PTM (information on the time when the start of the VOB is recorded), and TMAPIs (time map information of VOSUs constituting the VOB).

AV File

Accesses to AV files will be described with reference to FIG. 6B. Each AV file is composed of one or more VOBs.

The VOBs are consecutively recorded in the AV file. The VOBs in the AV files are managed by the management information files. To access a VOB, the player first accesses the management information file to read the VOB start address and the size. This enables the player to accesses the VOB. Each VOB is composed of a plurality of VOBUs. The VOBU is, as shown in FIG. 7, a unit of data which is composed of: (1) one or more GOPs of MPEG video data multiplexed as MPEG streams; and (2) a plurality of audio packs interleaved with the GOPs. The presentation time for each VOBU should not go out of a predetermined range. The encoder should generate VOBUs taking care of this. Also, a piece of data belonging to a VOBU should not be included in another VOBU. For example, data of a GOP included in a VOBU should completely be included in the VOBU. FIG. 8A shows an example in which data of a GOP belonging to a VOBU is stored in the last pack of the current VOBU and the first pack of the next VOBU, passing over the boundary between the two VOBUs The violation of the boundary between VOBUs such as this is not permitted.

Meanwhile, to make the most of the mass-storage optical disc DVD-RAM expected to be a next-generation AV record medium, the following problems should be solved. The present invention provides a DVD recorder which solves the problems and is used to record digital data onto DVD-RAM and reproduce the digital data recorded on DVD-RAM.

The DVD recorder is expected to be a next-generation AV record apparatus and be a commercial recorder that will replace the currently prevalent VTR. However, to replace the VTR, the DVD recorder needs to achieve higher-quality images and higher-level editing functions than the VTR.

With regards to the high-quality images, the variable bit rate technique for MPEG video is useful. In the variable bit rate technique, a greater number of Pictures are assigned to a frame whose image is more complicated and moves more, and a smaller number of Pictures are assigned to a frame whose image is less complicated and moves less. This technique causes successive Pictures to greatly change in the amount of data. Also, the high-quality editing functions are achieved by: (1) the random access function; and (2) the data retrieval function using the management file information, both being characteristics of DVD-RAM.

When these techniques are applied to the data structure of the AV file for the DVD-RAM described earlier, the following problems occur especially when VOBs are generated in real time using a real time encoder.

The variable bit-rate technique for MPEG video assigns a smaller number of Pictures to a frame whose image is less complicated and moves less. In doing this, the amount of data included in the Pictures is less than the payload 23 in the pack, a plurality of frames are stored in the payload 23. Meanwhile, as shown in FIG. 9B, each frame is decoded every 33.3667 msec during presentation. Here, suppose that five frames of Picture data is stored in the payload 1203 in the pack 1201 as shown in FIG. 9A. Then, the Picture data in "frm5" having reached the decoder waits for at least 100.1001 msec (during which "frm2" to "frm4" are decoded) in the video buffer 33 before it starts to be decoded. Here, if there was no limit to the number of frames included in one pack, and 32 or more frames of Pictures were stored in a pack, the Picture in the 32nd frame would wait in the decoder buffer for more than one second before it is decoded for the same reason as the example shown in FIGS. 9A and 9B. This violates the MPEG rule, and may cause the decoder to malfunction during presentation.

As shown in FIG. 8B, in DVD-RAM, data in a GOP belonging to a VOBU should not be included in another VOBU. That is to say, the GOP must be completely included in the VOBU. In other words, as shown in FIG. 8A, the pack including the last data of a GOP should not include the first data of the next GOP belonging to the next VOBU. However, when the number of Pictures in frames greatly changes depending on the complexity of the images when the variable bit rate technique is used, it is difficult for the video encoder to adjust in real time the number of generated Pictures to match the size of the payload 23 included in the pack.

Also, as shown in FIG. 6B, in DVD-RAM, the VOBU time map is referred to as basic information for accessing AV files. Also, video editing is performed in units of VOBUs. Suppose the audio data "a" and the audio data "b" shown in FIG. 8A are composed of audio frames that have the same presentation time. That is to say, suppose that a1 and b1, a2 and b2, and a3 and b3 have the same presentation time, respectively. Here, since a3 is not adjacent to b3, they happen to be arranged in different but successive VOBUs, sandwiching a video pack and the boundary between the VOBUs. If VOBU#1 was deleted by editing now, only b3 would remain. When only one of two pieces of audio data having the same presentation time is deleted or remains, the two pieces of audio data may cause a difference in the sounds when presented after editing. When a piece of data belonging to a VOBU is included in another VOBU, such an improper operation is caused after editing since the split pieces of data should be presented at the same time as the contents define.

SUMMARY OF THE INVENTION

It is therefore an object of the present invention to provide a DVD recorder which easily and surely conforms to the one-second rule and other rules relating to VOBU.

The above object is fulfilled by a system stream creating apparatus for creating a system stream, the system stream being a sequence of fixed-length packs, each pack storing a piece of video stream data, the video stream data being a sequence of picture data, the system stream creating apparatus comprising: a stream data transfer unit operable to extract a piece of picture data having a size of a payload from the video stream data and store the piece of picture data into a fixed-length pack; a header data generating unit operable to write a specified time in a header of the pack storing the piece of picture data, the specified time indicating a time when the piece of picture data of the pack is to be input to a video decoder buffer of a decoding apparatus; a condition judging unit operable to judge, when the header data generating unit writes the specified time, whether a difference between (1) a total number of pieces of picture data to be stored in the video decoder buffer up to the specified time and (2) a total number of pieces of picture data to be decoded by the decoding apparatus up to a unit time before the specified time has reached a predetermined value; a time updating unit operable to update the specified time; and a stop/resume control unit operable to, when the condition judging unit judges that the difference has reached the predetermined value, cause the header data generating unit not to write the specified time and cause the stream data transfer unit to stop storing the piece of video stream data, and when having caused the header data generating unit not to write and having caused the stream data transfer unit to stop storing, cause the time updating unit to update the specified time and cause the condition judging unit to judge whether the difference calculated using the updated specified time has reached the predetermined value, and when the condition judging unit makes the judgement negatively, cause the header data generating unit to write the specified time and cause the stream data transfer unit to resume storing the piece of video stream data.

With the above construction, the number of pictures stored in the video buffer of the decoder during a certain time period can be limited. This makes it possible to easily and surely conform to the one-second rule even if the data is encoded with a variable bit rate or even if data is encoded and recorded in real time.

In the above system stream creating apparatus, the decoding apparatus may decode one piece of picture data every video frame cycle, the unit time may be one second, and the predetermined value may be lower than a result of a division of one second by one video frame cycle.

With the above construction, the number of pictures included in the packs input to the decoding apparatus during one second is limitted to a number lower than 30. This makes it possible to easily and surely conform to the one-second rule.

The above object is also fulfilled by a recorder system comprising: the above system stream creating apparatus; and a recording apparatus which records a system stream generated by the system stream creating apparatus onto a record medium.

The above construction achieves a recorder system for generating a system stream which easily and surely conform to the one-second rule.

The above recorder system may further comprise: a reading apparatus which reads the system stream from the record medium; and a decoding apparatus which decodes the system stream read by the reading apparatus.

The above construction achieves a recorder system for generating a system strream which easily and surely conform to the one-second rule and decoding the generated system stream.

The above object is also fulfilled by a system stream creating apparatus for creating a system stream, the system stream being a sequence of fixed-length packs, each pack storing a piece of video stream data, the video stream data being a sequence of picture data, the system stream creating apparatus comprising: a stream data transfer unit operable to extract a piece of picture data having a size of a payload from the video stream data stored in a video buffer and store the piece of picture data into a fixed-length pack; a header data generating unit operable to write a specified time in a header of the pack storing the piece of picture data, the specified time indicating a time when the piece of picture data of the pack is to be input to a video decoder buffer of a decoding apparatus; a condition judging unit operable to judge, when a piece of picture data having a size of payload is extracted from the video buffer and stored into a fixed-length pack, whether an amount of data stored in the video buffer would be lower than or equal to a predetermined value if the piece of picture data having the size of payload were stored into the video buffer, using a model of change in the amount of data stored in the video buffer, the model being made on an assumption that picture data is input to the video buffer every certain time and a piece of picture data included in each pack is output from the video buffer at a specified time written in a header of each pack; a time updating unit operable to update the specified time; and a stop/resume control unit operable to, when the condition judging unit judges that the amount of data would be lower than or equal to the predetermined value, cause the header data generating unit not to write the specified time and cause the stream data transfer unit to stop storing the piece of picture data, and when having caused the header data generating unit not to write and having caused the stream data transfer unit to stop storing, cause the time updating unit to update the specified time and cause the condition judging unit to judge whether the amount of data stored in the video buffer would be lower than or equal to the predetermined value, and when the condition judging unit judges that the amount of data would exceed the predetermined value, cause the header data generating unit to write the specified time and cause the stream data transfer unit to resume storing the piece of picture data.

With the above construction, even if a pack stores in advance picture data having been expected to be stored a certain time later, a time the picture data should be input to the decoding apparatus is delayed. This easily prevents a number of pictures being stored in the video buffer of the decoder to break the one-second rule.

In the above system stream creating apparatus, the certain time may be a video frame cycle or a slice cycle.

With the above construction, the pictures are generated at the same intervals as the pictures are decoded. This enables the pictures to be stored in the video buffer of the decoder at shorter intervals than the pictures are decoded, easily preventing the one-second rule from being broken.

The above system stream creating apparatus may further comprise: a picture number judging unit operable to judge, when the stream data transfer unit stores a next piece of picture data into the pack, whether a total number of pieces of picture data in the pack has reached a predetermined number; and a transfer control unit operable to, when the picture number judging unit has judged positively, cause the stream data transfer unit to stop storing the next piece of picture data and store dummy data into the pack.

With the above construction, the number of stored pictures is limited in units of packs. This easily prevents the one-second rule from being broken due to over-storage of pictures in the video buffer of the decoder.

In the above system stream creating apparatus, the transfer control unit may cause the stream data transfer unit to store the next piece of picture data into another pack.

With the above construction, a picture not having been stored in a pack due to a limit to the number of stored pictures can be stored in a newly created pack.

The above system stream creating apparatus may further comprise: a video encoding unit operable to generate picture data by compressing a video signal when the picture number judging unit has judged negatively, and generating as many next start codes as correspond to remaining space of the pack as the dummy data when the picture number judging unit has judged positively, wherein the stream data transfer unit stores either the picture data or the next start codes generated by the video encoding unit into the pack.

With the above construction, the length of the packs can be adjusted to a fixed length by using the next start codes which are not treated as meaningful data by the decoder. The next start codes are stored in the video buffer when the packs are decoded. That is to say, the next start codes are generated by the video encoder, not by the system encoder. This enables the video encoder, which mainly generates the picture data, to accurately recognize and manage the occupied amount of the video buffer.

The above object is also fulfilled by a system stream creating apparatus for creating a system stream, the system stream being a sequence of fixed-length packs the system stream creating apparatus comprising: a video encoding unit operable to generate picture data and when having generated a last piece of picture data of a GOP, generate as many next start codes as correspond to remaining space of a pack which stores the last piece of picture data; and a stream data transfer unit operable to store either the picture data or the next start codes generated by the video encoding unit into a fixed-length pack.

With the above construction, the next start codes are stored in the pack that stores the last picture of a GOP. This easily prevents a picture of a GOP belonging to the next VOBU from being inserted into a pack of the current VOBU by mistake.

The above object is also fulfilled by a system stream creating apparatus for creating a system stream, the system stream being a sequence of fixed-length packs, each pack storing a piece of either video stream data or audio stream data, the video stream data being a sequence of picture data, the audio stream data being a sequence of audio frames, the system stream creating apparatus comprising: a stream data transfer unit operable to extract either a piece of picture data having a size of a payload from the video stream data or an audio frame from the audio stream data and store the extracted picture data or audio frame into a fixed-length pack; and a transfer control unit operable to control the stream data transfer unit so that a group of audio frames provided through a plurality of channels and having the same presentation time in common are stored in a group of packs which have been generated successively.

The above construction makes it easy to store the audio frames belonging to different channels and having the same PTS in common into the packs that are arranged successively in a system stream.

The above system stream creating apparatus may further comprise: a header data generating unit operable to write a specified time into a header of a pack, the specified time indicating a time when either a piece of picture data or an audio frame included in the pack is to be input to a decoding apparatus, wherein when a difference between a presentation time of the audio frame and the specified time written in the header of the pack is lower than a certain value, the transfer control unit causes the stream data transfer unit to store the audio frame into the pack.

With the above construction, when there are two audio frames belonging to different channels and having the same PTS, one of them is first packed since the difference between PTS and SCR of the audio frame is lower than a predetermined value, and the other audio frame is packed in the next packing since the difference between PTS and SCR of the other audio frame is also lower than a predetermined value without fail. As a result, the two packs storing the two audio frames are arranged successively in the system stream.

The above object is also fulfilled by a system stream creating method for creating a system stream, the system stream being a sequence of fixed-length packs, each pack storing a piece of video stream data, the video stream data being a sequence of picture data, the system stream creating method comprising: a stream data transfer step for extracting a piece of picture data having a size of a payload from the video stream data and storing the piece of picture data into a fixed-length pack; a condition judging step for judging, when a specified time, which indicates a time when the piece of picture data stored in a pack is to be input to a video decoder buffer of a decoding apparatus, is written in a header of the pack storing the piece of picture data, whether a difference between (1) a total number of pieces of picture data to be stored in the video decoder buffer up to the specified time and (2) a total number of pieces of picture data to be decoded by the decoding apparatus up to a unit time before the specified time has reached a predetermined value; a specified time writing step for writing the specified time into the pack storing the piece of picture data when it is judged in the condition judging step that the difference has not reached the predetermined value; and a specified time adjusting step for, when it is judged in the condition judging step that the difference has reached the predetermined value, updating the specified time, judging whether a difference between (1) a total number of pieces of picture data to be stored in the video decoder buffer up to the updated specified time and (2) a total number of pieces of picture data to be decoded by the decoding apparatus up to a unit time before the updated specified time has reached the predetermined value, and when the judgement is made negatively, writing the updated specified time into the pack storing the piece of picture data.

With the above construction, the number of pictures stored in the video buffer of the decoder can be limited a certain time before the storage. This makes it possible to easily and surely conform to the one-second rule even if the data is encoded with a variable bit rate or even if data is encoded and recorded in real time.

BRIEF DESCRIPTION OF THE DRAWINGS

These and other objects, advantages and features of the invention will become apparent from the following description thereof taken in conjunction with the accompanying drawings which illustrate a specific embodiment of the invention. In the drawings:

FIGS. 3A to 3D show relationships between the video data, video buffer, MPEG system stream, and audio data;

FIGS. 8A and 89 show the construction of inappropriate VOBU and normal VOBU;

FIGS. 9A and 9B show relationships between the pack data construction and the frame decoding timing;

DESCRIPTION OF THE PREFERRED EMBODIMENTS

Figure 1:
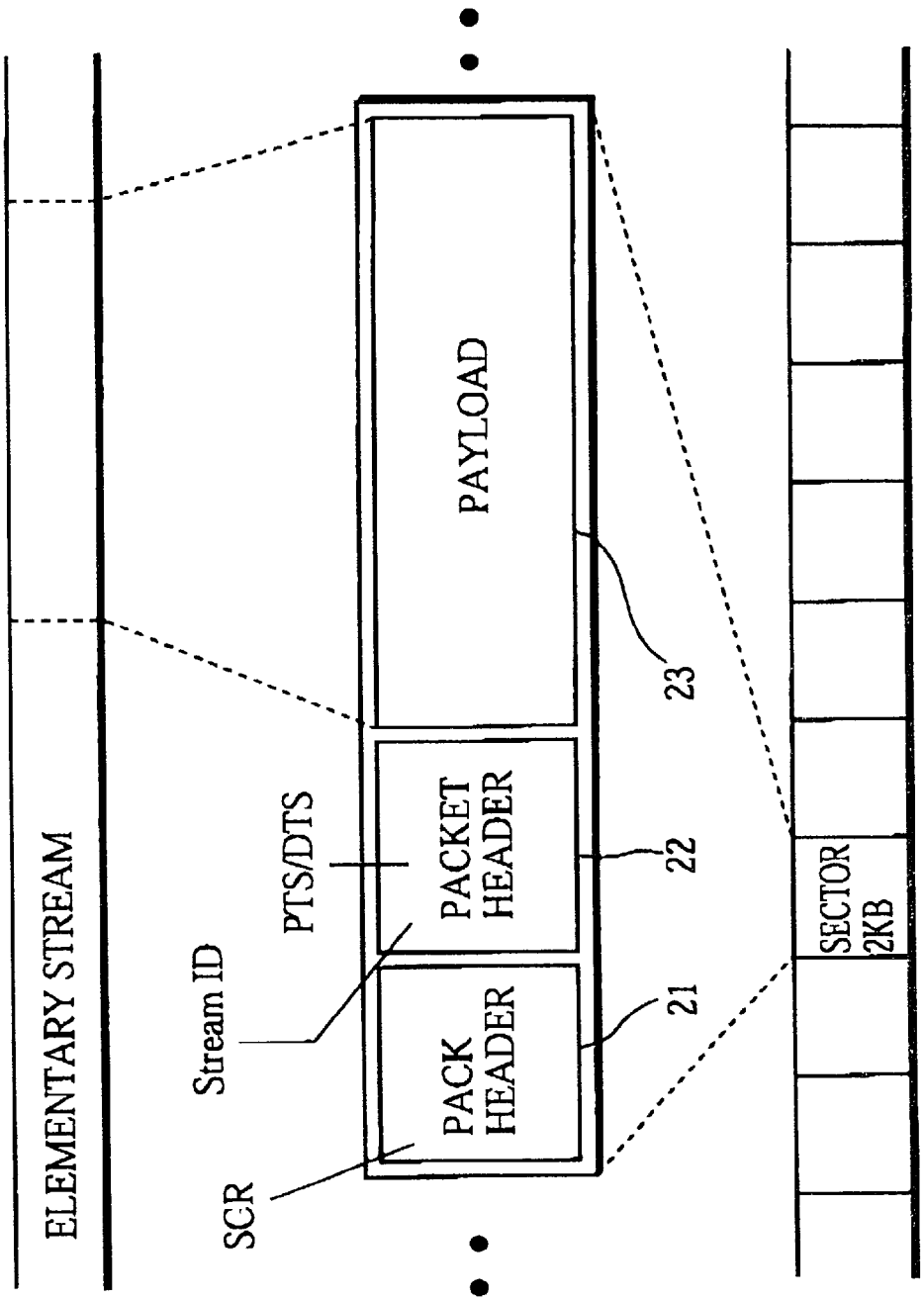
FIG. 1 shows the construction of the MPEG system stream.

The following are description of the present invention through specific embodiments thereof by way of referring to the drawings.

Embodiment 1

Embodiment 1 relates to a DVD recorder for generating system streams which allow a decoder to conform to the "one-second rule".

Construction

Figure 10:
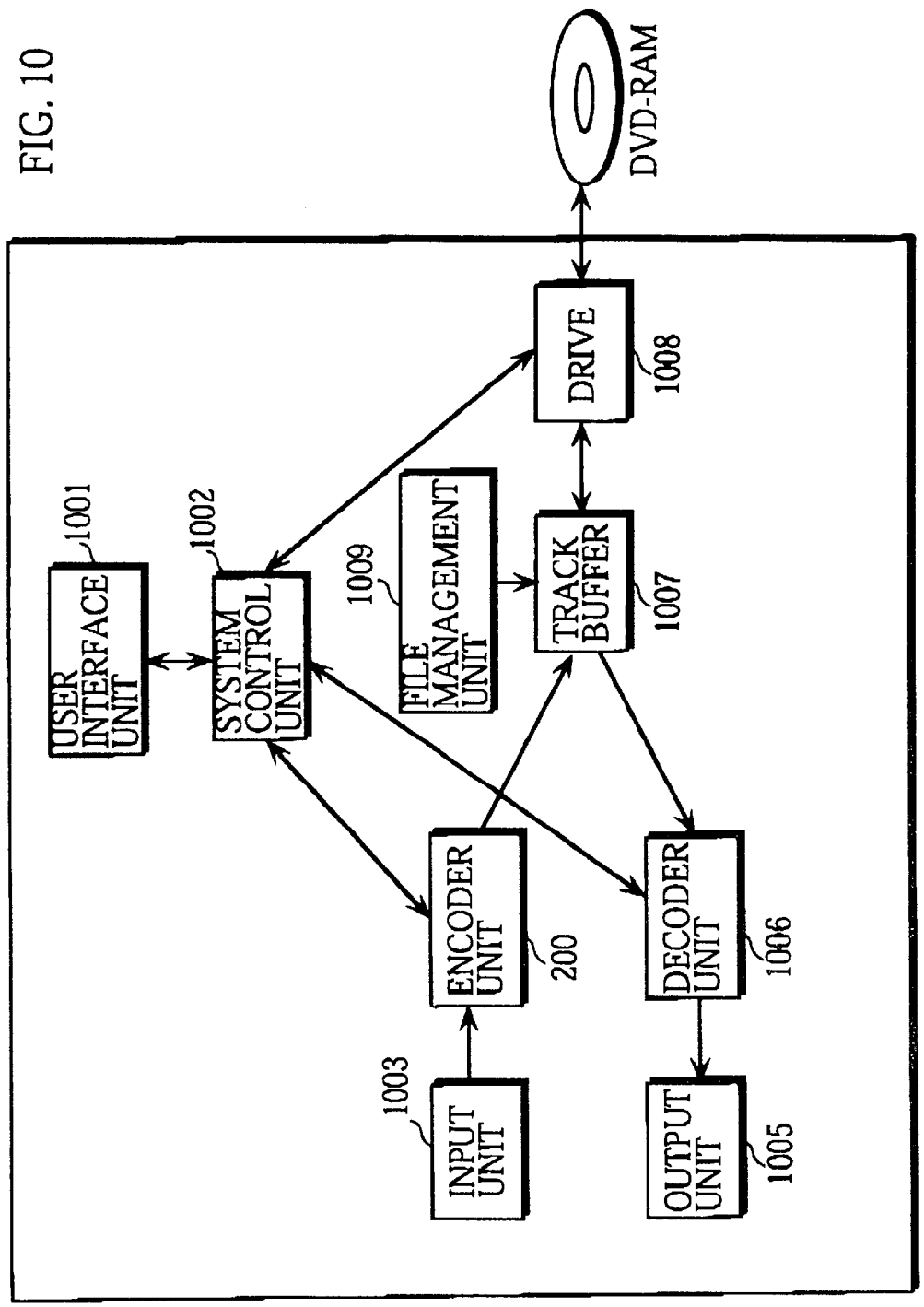
FIG. 10 is a block diagram showing the construction of the DVD recorder.

FIG. 10 is a block diagram showing the construction of the DVD recorder in the present embodiment. The DVD recorder includes a user interface unit 1001, a system control unit 1002, an input unit 1003, an encoder unit 200, an output unit 1005, a decoder unit 1006, a track buffer 1007, a drive 1008, and a file management unit 1009.

The user interface unit 1001 receives, from the user, instructions to record and instructions to reproduce.

The system control unit 1002 sends an instruction to the encoder unit 200 when the user inputs a record instruction.

The input unit 1003 inputs external video and audio signals.

The encoder unit 200 generates system streams, which are MPEG program streams, from the video signals and audio signals sent from the input unit 1003, and sends the system streams to the track buffer 1007.

The output unit 1005 displays decoded video signals on a monitor, and outputs decoded audio signals to a speaker.

Figure 2:
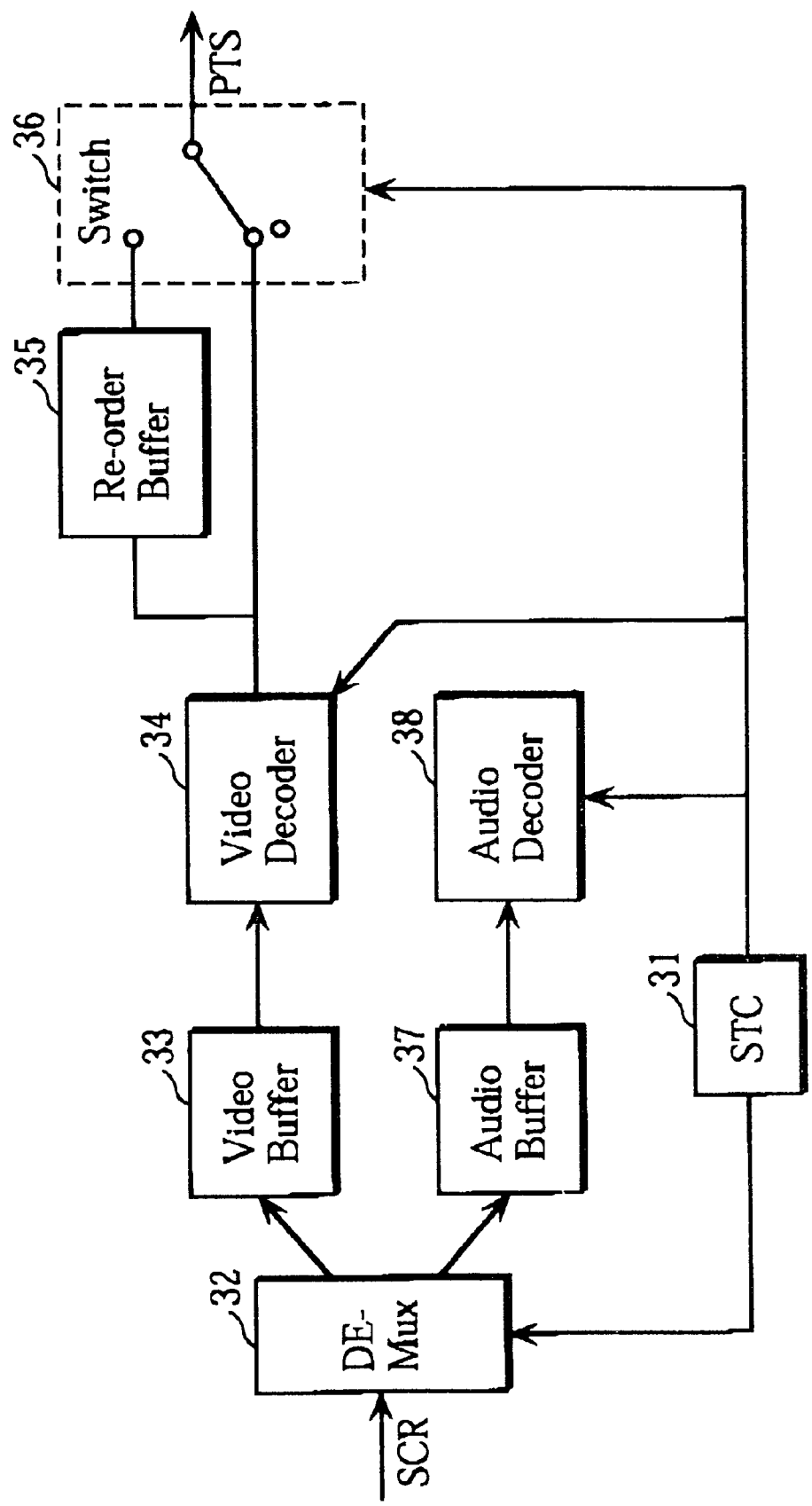
FIG. 2 shows the construction of the MPEG system decoder.
Figure 4A:
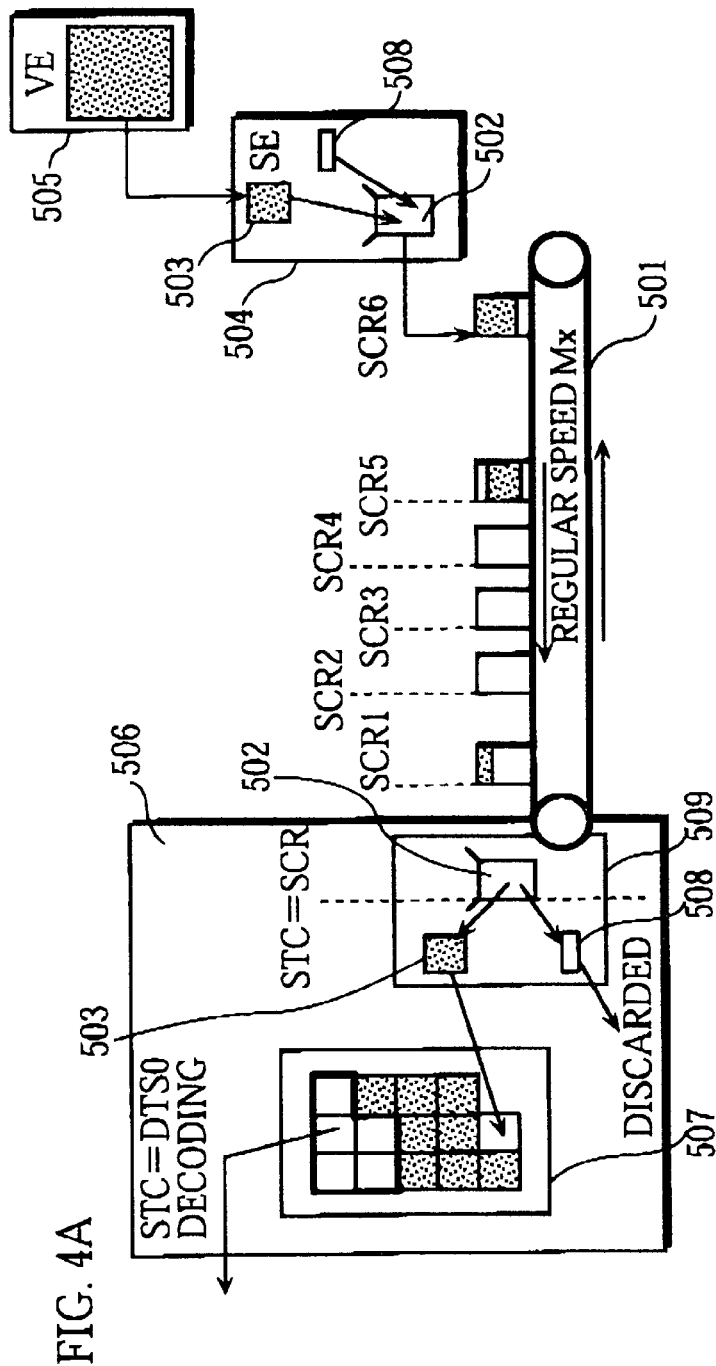
FIGS. 4A and 4B show relationships between an ideal model of multiplication and the system stream.
Figure 4B:
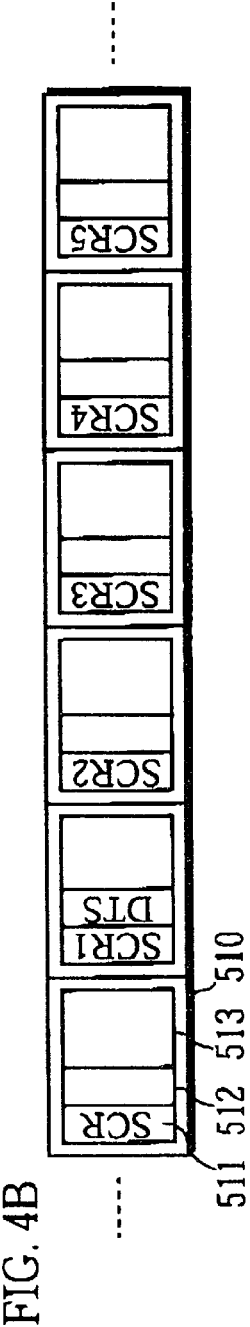
Figure 5A:
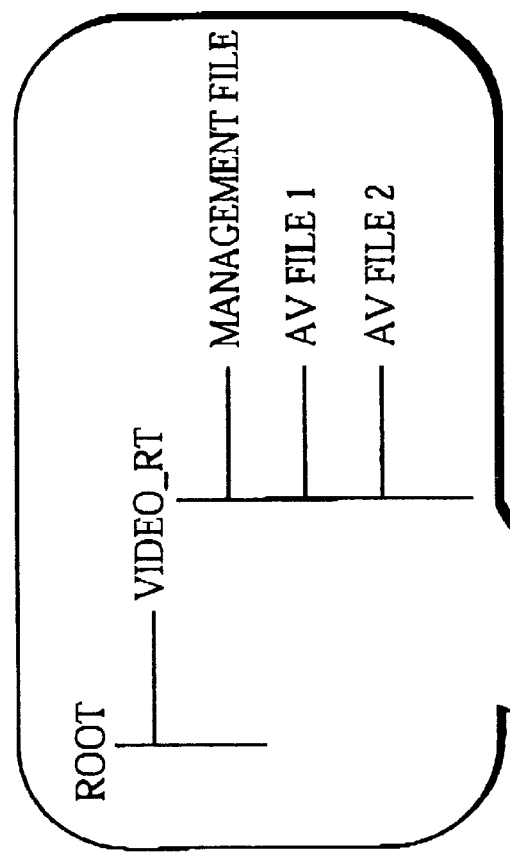
FIGS. 5A and 5B show the logical construction of DVD-RAM.
Figure 5B:
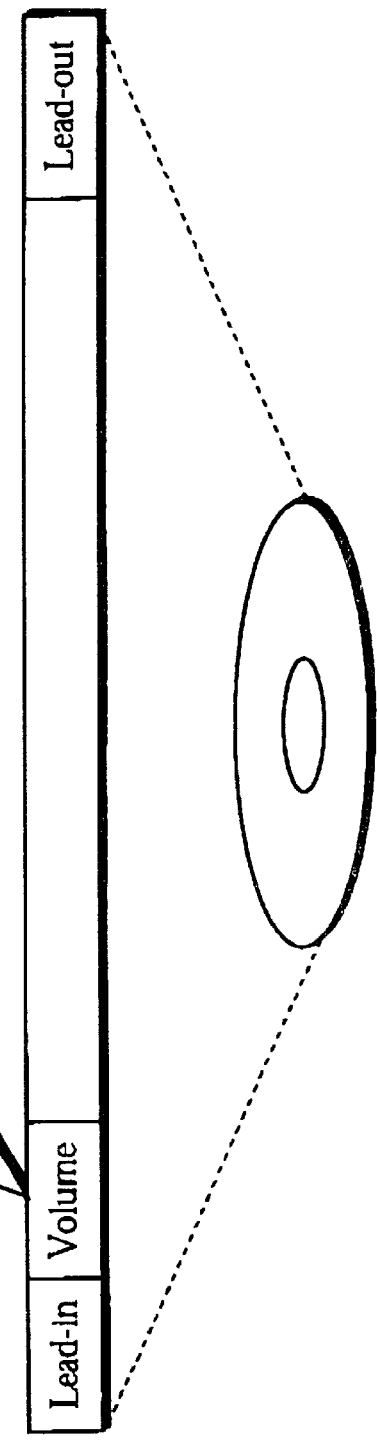
Figure 6A:
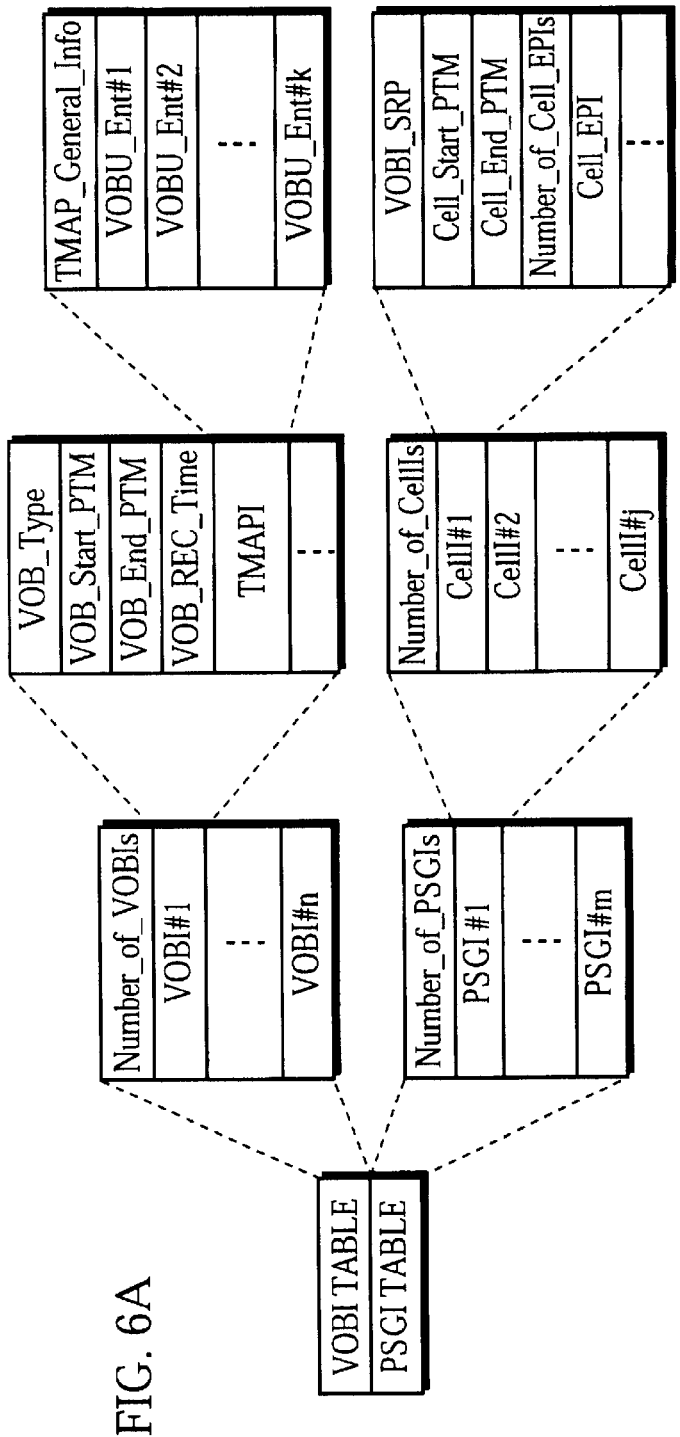
FIGS. 6A and 6B show management information data and a method of accessing files.
Figure 6B:
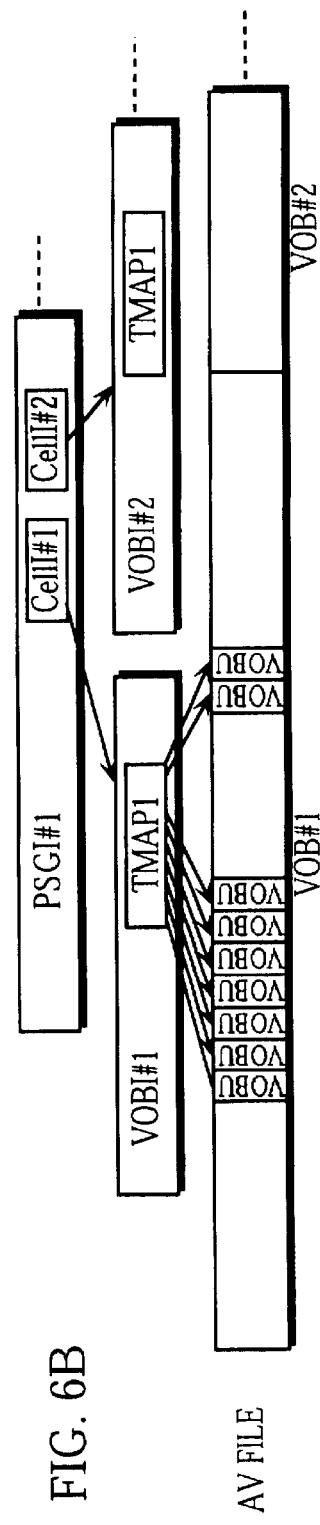
Figure 7:
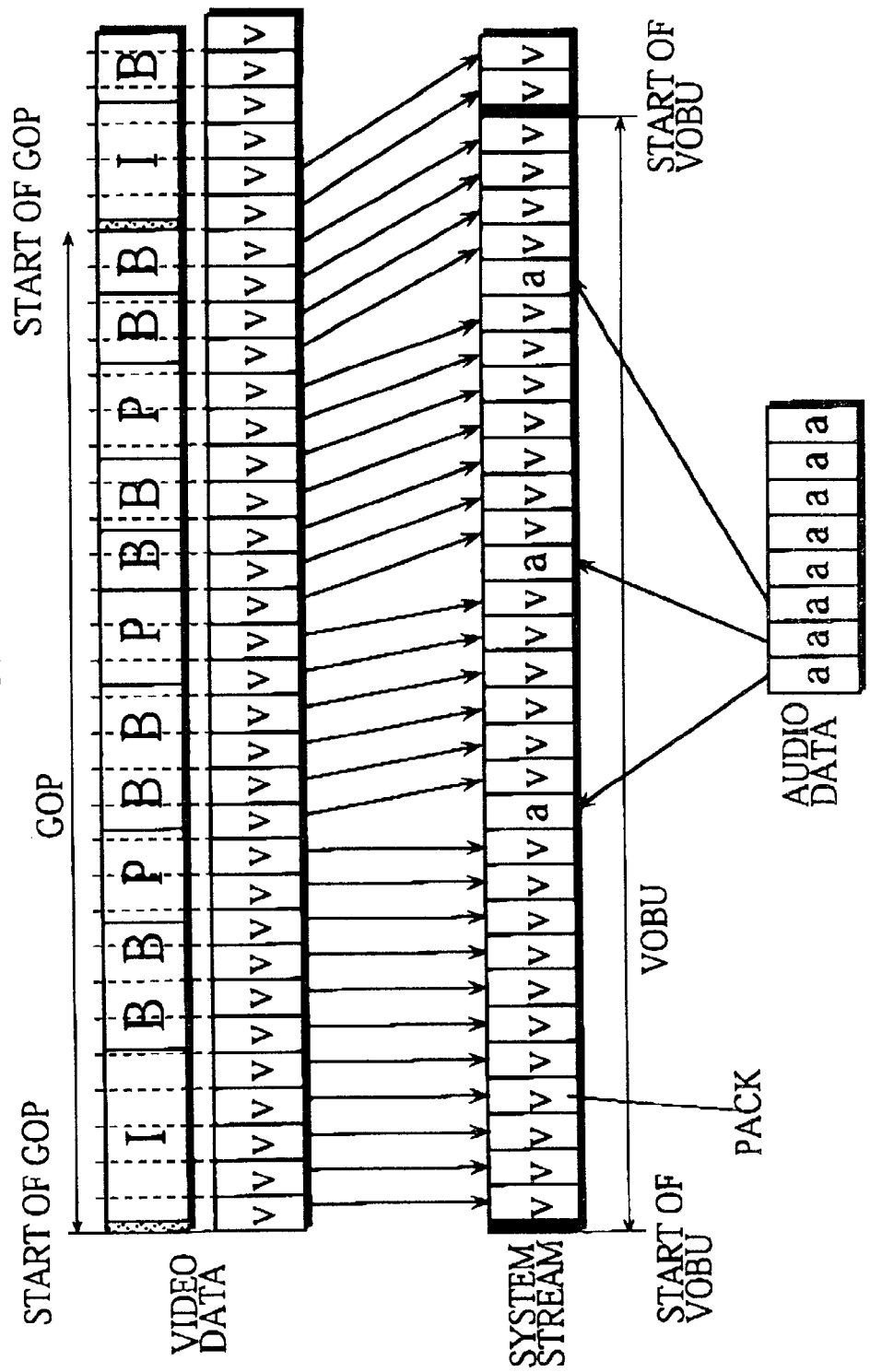
FIG. 7 shows the construction of VOBU.
Figure 8A:
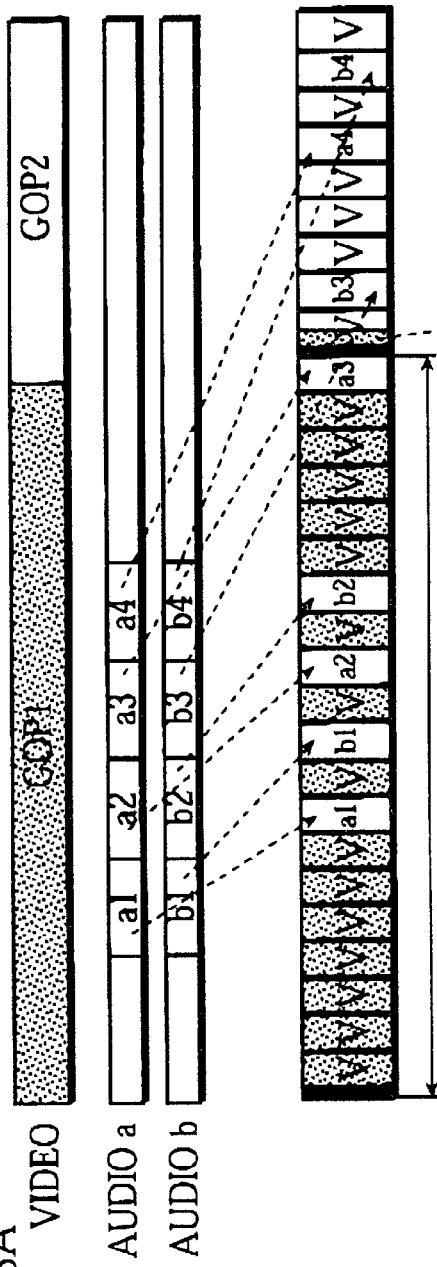
Figure 8B:
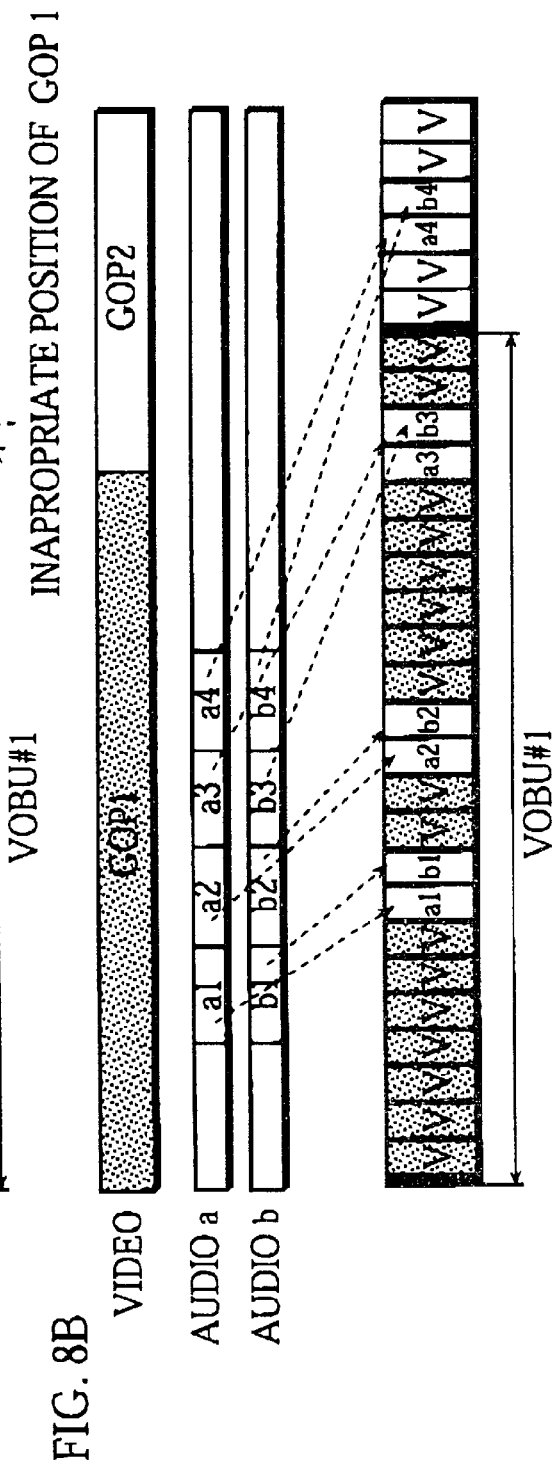

The decoder unit 1006, when having received the instruction from the system control unit 1002, reads system streams from the track buffer 1007 and decodes the system streams. The detailed construction of the decoder unit 1006 is the same as the decoder apparatus shown in FIG. 2.

The track buffer 1007 stores system streams. When the amount of the stored system streams reaches a certain value, the system control unit 1002 instructs the drive 1008 to record the system streams onto the DVD-PAM.

The file management unit 1009 manages the files to be recorded on the DVD-RAM, in units of VOBUs.

Now, the encoder unit 200 will be described in detail.

Figure 11:
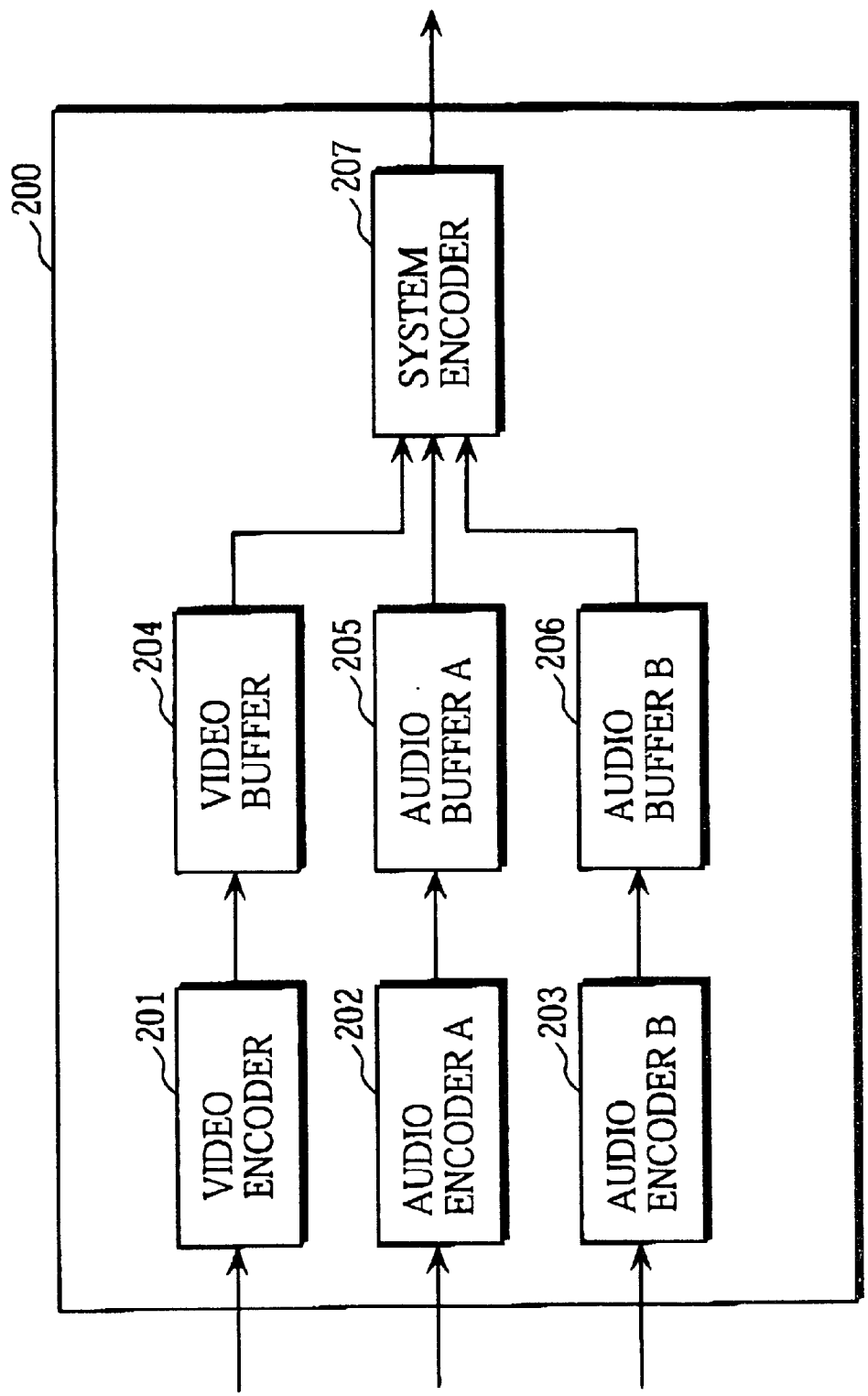
FIG. 11 is a block diagram showing the construction of the encoder unit 200.

FIG. 11 is a block diagram showing the construction of the encoder unit 200. The encoder unit 200 includes a video encoder 201, an audio encoder A 202, an audio encoder B 203, a video buffer 204, an audio buffer A 205, an audio buffer B 206, and a system encoder 207.

The video encoder 201 generates, from video signals, a video stream which is composed of I-, B-, or P-Pictures, and stores the video stream in the video buffer 204. In doing so, the video encoder 201 adjusts the amount of data it generates so as not to cause an overflow or underflow in a video buffer of a decoder.

The audio encoder A 202 and the audio encoder B 203 generate audio stream A and audio stream B from audio signals, and store the audio stream A and audio stream B in the audio buffer A 205 and audio buffer B 206, respectively.

The video buffer 204 temporarily stores the video stream.

The audio buffer A 205 temporarily stores the audio stream A.

The audio buffer B 206 temporarily stores the audio stream B.

Figure 12:
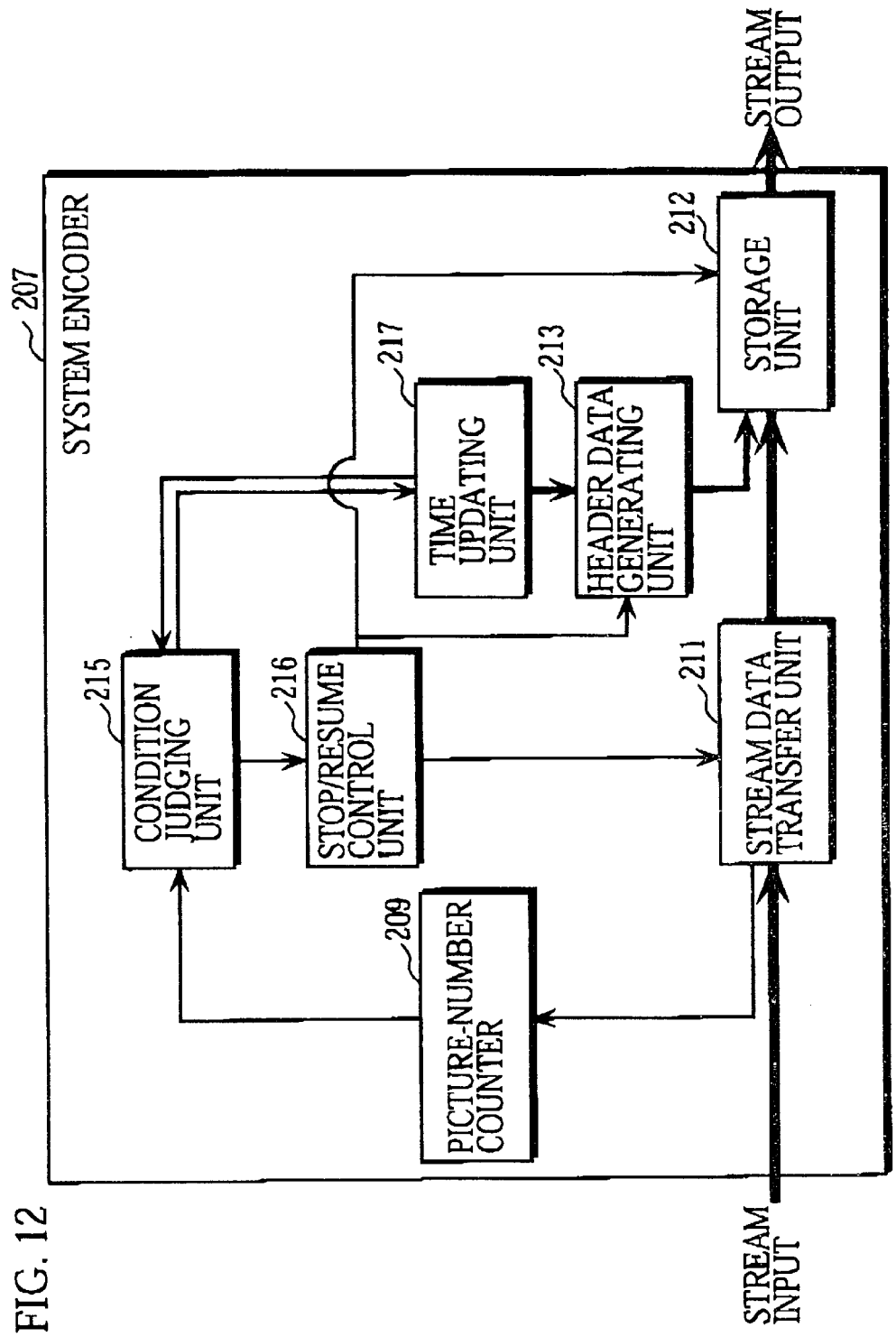
FIG. 12 is a block diagram showing a detailed construction of the system encoder 207.

FIG. 12 shows a detailed construction of the system encoder 207. As shown in FIG. 12, the system encoder 207 includes a stream data transfer unit 211, a storage unit 212, a header data generating unit 213, a condition judging unit 215, a stop/resume control unit 216, a time updating unit 217, and a Picture-number counter 209. In FIG. 12, the thick solid line indicates flow of data, and a normal solid line indicates flow of control signals.

The storage unit 212 is a working memory used for creating the packs.

The stream data transfer unit 211 extracts parts of the streams one by one from the buffer 204, audio buffer A 205, and audio buffer B 206, and stores the extracted parts into the storage unit 212.

The header data generating unit 213 writes SCR, DTS and the like into the pack header.

The Picture-number counter 209 stores values j and k, where j is the total number of Pictures stored in the video buffer 33 of the decoder up to the time indicated by the current SCR, and k is the total number of Pictures output from the video buffer 33 up to one second before the time indicated by the current SCR.

The time updating unit 217 updates SCR in accordance with the system stream transfer rate.

The condition judging unit 215 judges whether the value (j−k) has reached a predetermined value n, based on the Picture-number counter 209 when the header data generating unit 213 writes SCR.

The stop/resume control unit 216, when the condition judging unit 215 judges the above positively, causes the header data generating unit 213 not to write SCR into the pack header and causes the stream data transfer means 211 to temporarily stop geneting video packs.

The stop/resume control unit 216 causes the time updating unit 217 to update SCR after the above temporary stops, and causes the condition judging unit 215 to judge, for each update, whether the value (j−k) has reached the value n. The stop/resume control unit 216 causes the header data generating unit 213 to write SCR into the pack header and causes the stream data transfer means 211 to resume geneting video packs when the condition judging unit 215 judges the above negatively.

Figure 13:
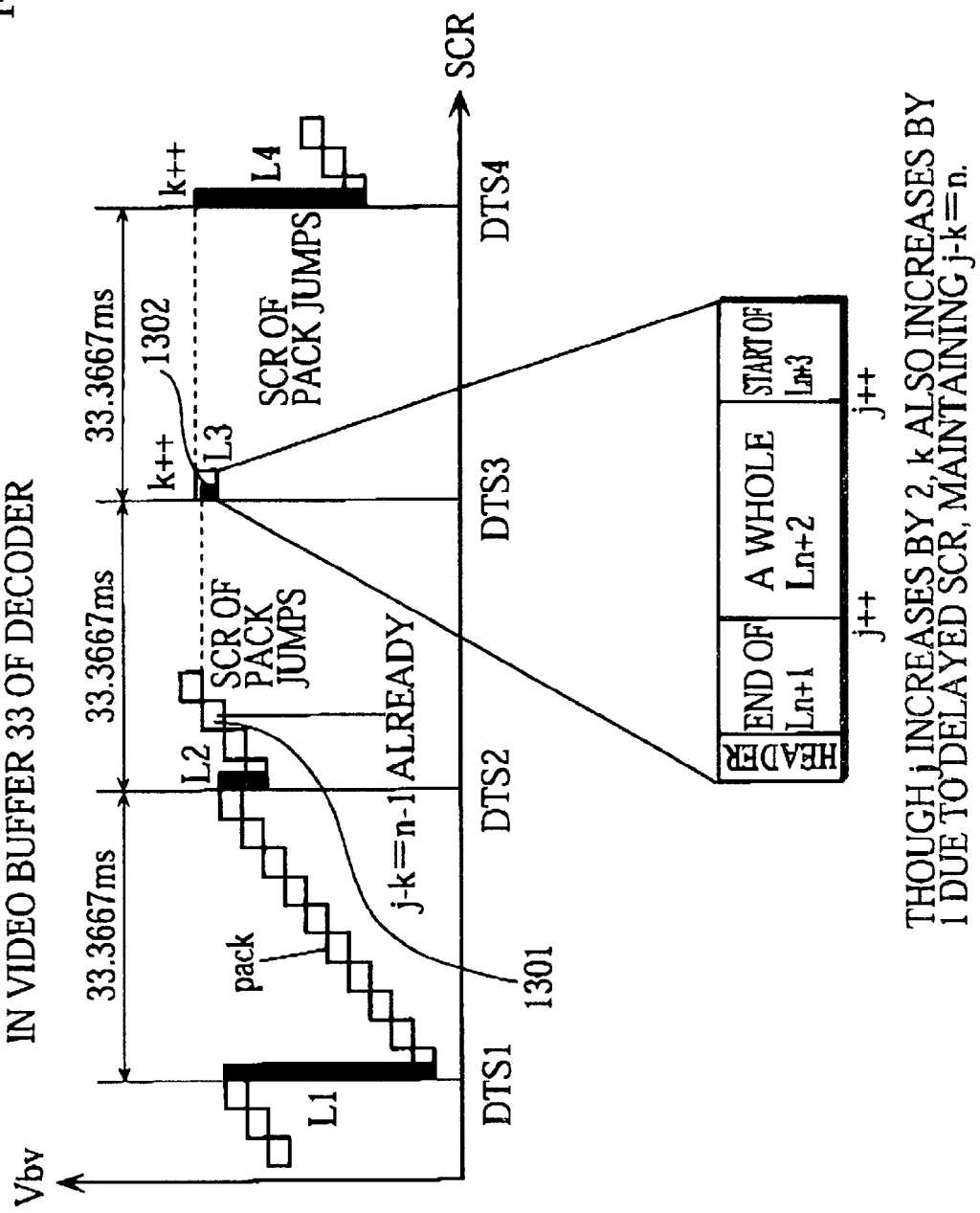
FIG. 13 shows a model of the change in the amount of data stored in the video buffer 33 of the decoder.

The system encoder 207 generates system streams which allow a decoder to conform to the "one-second rule". FIG. 13 shows a model of the change in the amount of data stored in the video buffer 33 of the decoder. As shown in FIG. 13, Pictures in packs are sequentially input to the video buffer 33 at the times specified by the SCRs. This increases the storage amount Vbv. A Picture is output for decoding from the video buffer 33 at each DTS time (every 33.3667 msec). This decreases the storage amount Vbv. With the earlier-defined meaning of the values j and k, the value (j−k) represents the number of Pictures stored in the video buffer 33 during one second before the time indicated by the current SCR. Since it takes 33.3667 msec to decode one Picture, the video buffer 33 stores Pictures corresponding to (j−k)X 33.3667 msec. The system encoder 207 limits the value (j−k) to the value n (an integer of 29 or lower and having been predetermined in the system) by adjusting SCR written in the pack, thus generating such system streams as conform to the one-second rule.

Operation

The operation of generating the system streams will be described.

Figure 14:
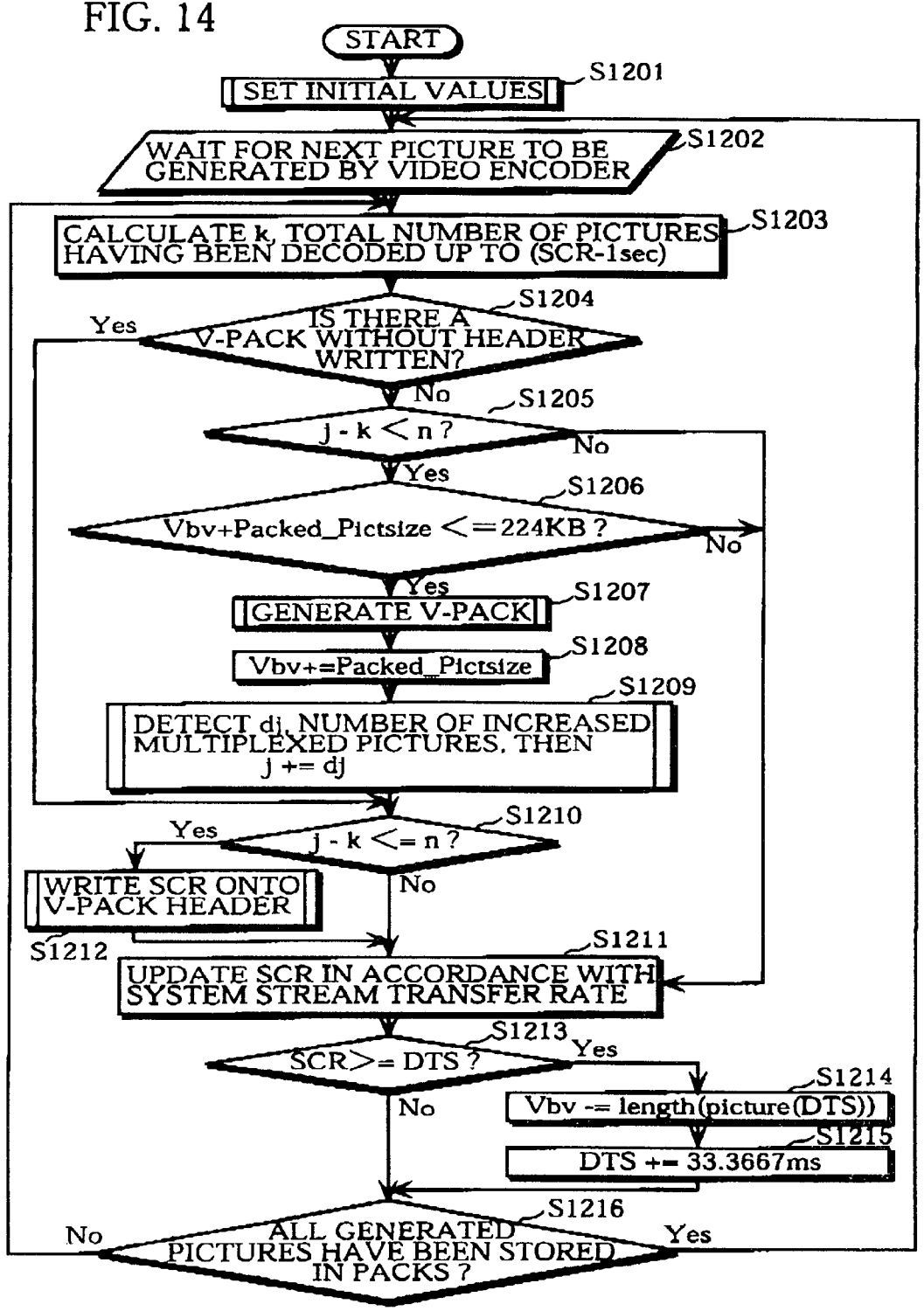
FIG. 14 is a flowchart showing the procedure of generating system streams.

FIG. 14 is a flowchart showing the procedure of generating system streams in the present embodiment.

First, values such as SCR and DTS are set to the initial values (step S1201).

The system encoder 207 then waits for the next Picture to be generated by the video encoder 201 and stored in the video buffer 204, and starts the multiplexing process after a certain amount of Pictures are generated (step S1202).

The system encoder 207 then calculates value k, being the total number of Pictures output from the video buffer 33 up to one second before the time indicated by the current SCR. Here, when the initial value for DTS is represented as DTSO, k is an integer included in a result of (SCR−DTSO 1 sec)/33.3367 msec. The value k is 0 until SCR exceeds (DTS+1 sec) (step S 1203).

The system encoder 207 proceeds to the following process when there is no incompletely written video pack left. When value (j−k) is n or higher, or when the video buffer 33 would overflow if it receives a new Picture in a video pack (i.e., when the amount of data (Vbv) stored in the video buffer is to exceed 224 KB if the amount of data of the new video Picture is added), the system encoder 207 stops generating video packs, jumps to step S1211, and updates SCR (steps S1205, S1206, and S1211).

When value (j−k) is lower than n and when the video buffer 33 is not expected to cause all overflow, the system encoder 207 generates a video pack and increments Vbv by the amount of data of the Pictures stored in the video pack (Packed Pictsize) (steps S1205, S1206, S1207, and S1208).

The system encoder 207 determines how many Pictures have been added to "j" representing the number of multiplexed Pictures and increments "j" by "dj" representing the number of increased Pictures (step S1209).

The system encoder 207 does not generate a Picture (i.e., generates a pack and stores a Picture in the pack) and jumps to step S1210 when it is judged in step S1204 that there is a video pack without SCR written in its header (i.e., it is judged as "No" in step S1210 which will be described later).

The system encoder 207 writes the current SCR into the pack header when (j−k) is expected to be n or lower if the Picture of the video pack is input to the video buffer 33. This is because the video pack can be input to the video buffer 33 at the time specified by the current SCR. When (j−k) is expected to exceed n, the system encoder does not write the current SCR into the pack header and holds the incomplete video pack (steps S1210 and S1212).

When the updated SCR is equal to or higher than DTS, a Picture is decoded. The system encoder 207 therefore decrements Vbv by the amount of data of the Picture, and adds 33.3667 msec to the DTS (step S1214 and S1215).

The system encoder 207 waits for a new Picture to be generated when all the Pictures so far have been stored in packs; and repeats the above process starting from step S1203 when there is a Picture not having been stored in a pack or when a new Picture is generated (steps S1216, S1203, and S1204).

The above process will be described more specifically with reference to the example shown in FIG. 13.

Suppose that (j−k) for the pack 1301 shown in FIG. 13 is (n−1). Also suppose that the next pack stores the end portion of the $(Ln+1)^{th}$ Picture, a whole $(Ln+2)^{th}$ Picture, and the first portion of the $(Ln+3)^{th}$ Picture. Here, the current SCR is written in the pack 1301, (j−k)=(n+1) since j is incremented by 2. The SCR of the pack is moved backward by one DTS in accordance with the flowchart shown in FIG. 14, and k is incremented by one. When this happens, (j−k)=n is maintained. In this way, (j−k) can be limited to the predetermined value n or lower. When n is defined as an integer of 29 or lower, it is possible to conform to the one-second rule.

Brief Account

As described above, the DVD recorder of the present embodiment can limit the number of Pictures stored in the video buffer 33 during one second to a predetermined number n. As a result, the DVD recorder generates system streams which allow a decoder to easily and surely conform to the "one-second rule" even when data is encoded with a variable bit rate or even when data is encoded and recorded in real time.

Embodiment 2

Embodiment 2 relates to a DVD recorder for generating system streams which allow a decoder to easily conform to the "one-second rule" by adjusting the number of Pictures stored in each pack or by adjusting SCR.

Construction

The construction of the DVD recorder of the present embodiment is almost the same as Embodiment 1. Only the portions different from Embodiment 1 will be described here.

Figure 15:
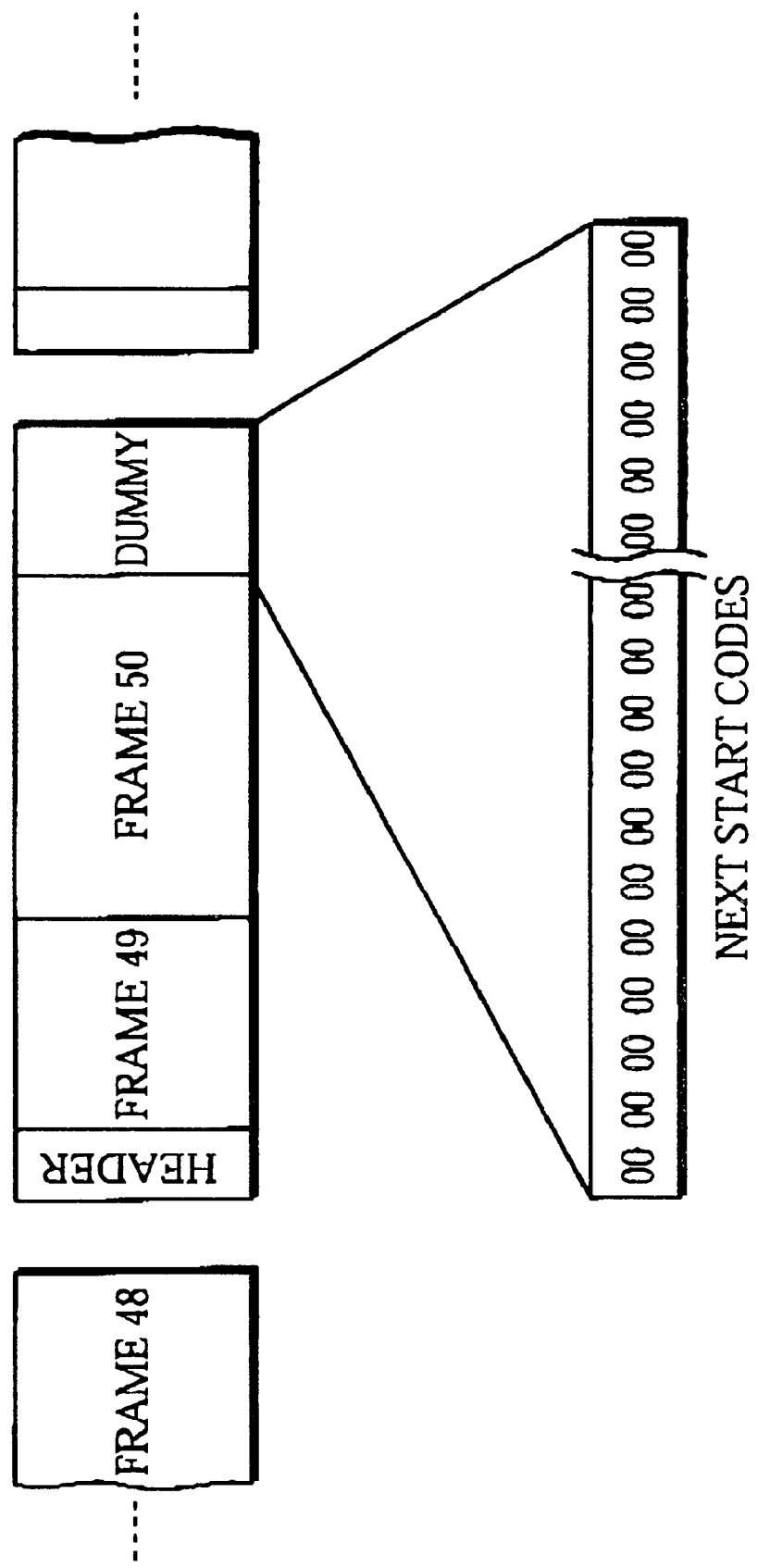
FIG. 15 shows an example in which "next start codes" are generated.

When the total number of Pictures (including the case where only a part of one Picture is stored) stored in a pack is a predetermined number (in this embodiment, 2), the video encoder 201 generates as many "next start codes" as correspond to the remaining space of the pack. FIG. 15 shows an example in which "next start codes" are generated because two Pictures (frames) are stored in a pack. When the predetermined number is set to a lower number, it is expected that the amount of transferred dummy data will increase, the amount of transferred Pictures, which is important, will decrease, and the image quality will be degraded. In the present embodiment the predetermined number is set to 2. The value, that should enable the system streams to conform to the one-second rule and maintain the image quality, has been determined through experiments. The experiments have revealed that the system streams conform to the one-second rule and the image quality is not degraded drastically under conditions that the system stream transfer rate is 10.08 Mbps and that the video data effective transfer rate is 9.6 Mbps (approximately 630 packs are transferred per one second).

The system encoder 207 adjusts SCR written in a pack so that the number of Pictures output from the video buffer 204 of an encoder does not drastically increase at a certain time.

Figure 16:
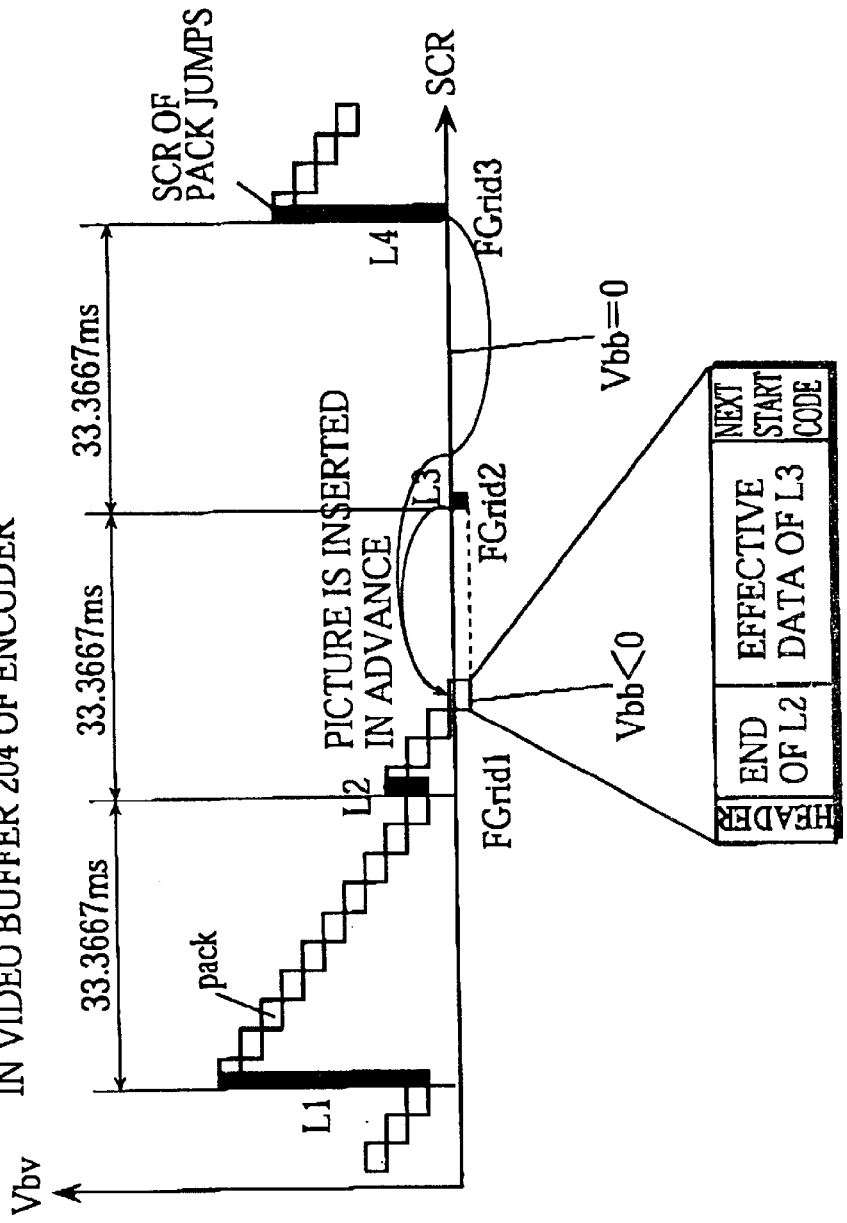
FIG. 16 shows a model of the change in the amount of data stored in the video buffer 204 of the encoder.

FIG. 16 shows a model of the change in the amount of data stored in the video buffer 204 of the encoder. As shown in FIG. 16, Pictures are output from the video buffer 204 and inserted into packs at the times specified by the SCRs. This decreases the storage amount Vbb. A Picture generated by the video encoder 201 is input to the video buffer 204 at each FGrid time (every 33.3667 msec). This increases the storage amount Vbb.

When the storage amount Vbb is expected to be 0 or lower, the system encoder 207 inserts in advance the Picture to be inserted at the next FGrid into the remaining space of the pack. In the example shown in FIG. 16, Vbb is 0 when L2 is inserted into a pack. Therefore, L3 data (execution data representing a Picture and dummy data) to be inserted at the next FGrid (FGrid2) is inserted into the remaining space of the pack in advance. The dummy data has been generated by this time since the total number of Pictures in the pack was 2 when the video encoder 201 generated the Picture data of L3.

The system encoder 207 sets SCR to an FGrid a certain time later, the certain time corresponding to the number of Pictures inserted in advance, and writes the updated SCR into the pack header of the pack into which a Picture has been inserted in advance. In the example shown in FIG. 16, the system encoder 207 sets SCR from FGrid2 to FGrid3 since the number of Pictures inserted in advance is 1. In this way, each time Pictures are inserted in advance, SCR is set to an FGrid a certain time later, the certain time corresponding to the number of Pictures inserted in advance with this construction, the video buffer 33 does not store excessive Pictures.

Now, portions of the system encoder 207 different from Embodiment 1 will be described.

The stream data transfer unit 211 extracts parts of the streams one by one from the video buffer 204, audio buffer A 205, and audio buffer B 206, and stores the extracted parts into the storage unit 212.

The header data generating unit 213 writes SCR into the pack header, where the SCR is the time when the stream data transfer unit 211 extracted the Picture from the video buffer 204.

The condition judging unit 215 judges whether the amount of data (Vbb) stored in the video buffer 204 is expected to be a positive value if the stream data transfer unit 211 stores a Picture.

The stop/resume control unit 216, when the condition judging unit 215 judges the above negatively, causes the header data generating unit 213 not to write SCR into the pack header and causes the stream data transfer unit 211 to temporarily stop storing Pictures.

The stop/resume control unit 216 causes the time updating unit 217 to update SCR after the above temporary stops, and causes the condition judging unit 215 to judge, for each update, whether Vbb is expected to be a positive value. The stop/resume control unit 216 causes the header data generating unit 213 to resume writing SCR into the pack header and causes the stream data transfer unit 211 to resume storing Pictures when the condition judging unit 215 judges the above positively.

Operation

The operation of generating the system streams will be described.

Figure 17:
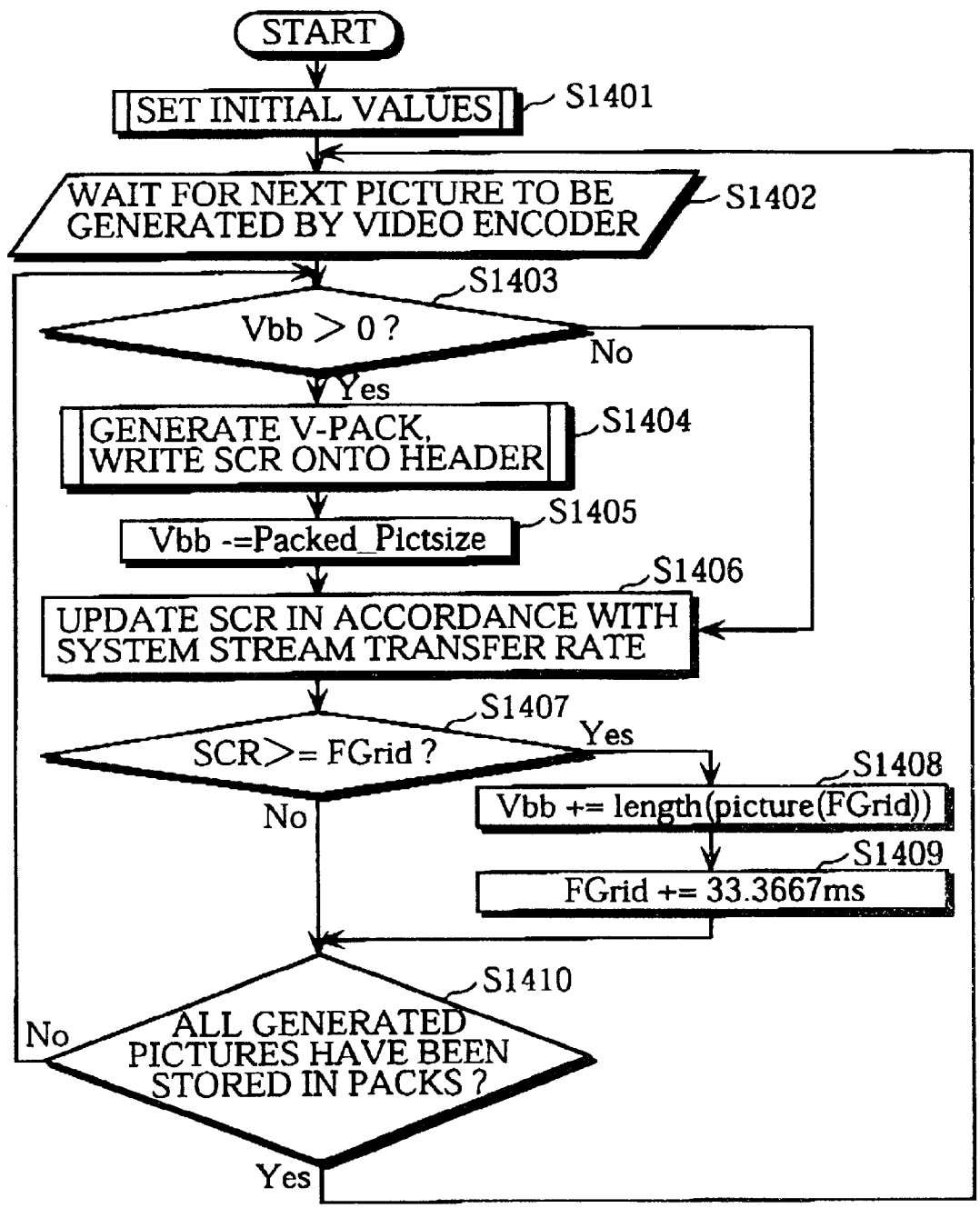
FIG. 17 is a flowchart showing the procedure of generating system streams.

FIG. 17 is a flowchart showing the procedure of generating system streams in the present embodiment.

First, values such as SCR and FGrid are set to the initial values (step S1401).

The system encoder 207 then waits for a certain amount of Pictures to be generated by the video encoder 201 and stored in the video buffer 204 (step S1402).

The system encoder 207 then generates a video pack when the amount of data (Vbb) stored in the video buffer 204 is expected to be a positive value if it generates the video pack, and decrements Vbb by the amount of data of the Pictures stored in the video pack (Packed_Pictsize). The system encoder 207 stops generating video packs when Vbb is not expected to be a positive value (steps S1403, S1404, and S1405).

When the updated SCR is equal to or higher than FGrid, the system encoder 207 judges that the next Picture is stored in the video buffer 204, increments Vbb by the amount of data of the next Picture, and adds 33.3667 msec to FGrid (steps S1408 and S1409).

The system encoder 207 waits for a new Picture to be generated when all the Pictures generated by the video encoder so far have been stored in packs; and repeats the above process starting from step S1403 when there is a Picture not having been stored in a pack or when a new Picture is generated (steps S1410, S1402, and S1403).

Brief Account

As described above, the DVD recorder of the present embodiment adjusts the number of Pictures to be stored in each pack and adjusts SCR so as to generate system streams which allow a decoder to easily conform to the "one-second rule".

Embodiment 3

Embodiment 3 relates to a DVD recorder which inserts dummy data into the last pack of a GOP, instead of pictures of the next GOP.

Construction

The DVD recorder of the present embodiment differs from Embodiment 1 only in that the video encoder 201 has a partly different function and that the picture number storage unit is replaced with the picture amount storage unit. The following is the description of the video encoder 201 and the picture amount storage unit.

The picture amount storage unit stores the data amount of all pictures belonging to a currently generated GOP.

The video encoder 201 has the following functions for attaining the object of the present embodiment. The video encoder 201 encodes video signals to generate I, B, and P Pictures, and increments the data amount of all pictures stored in the picture amount storage unit in proportionate to the data amount of the generated pictures. When having generated the last picture of one GOP, the video encoder 201 calculates the remaining capacity of the pack which includes the last picture, based on the data amount of all pictures stored in the picture amount storage unit. The video encoder 201 then generates as many next start codes as the calculated remaining capacity.

Figure 18:
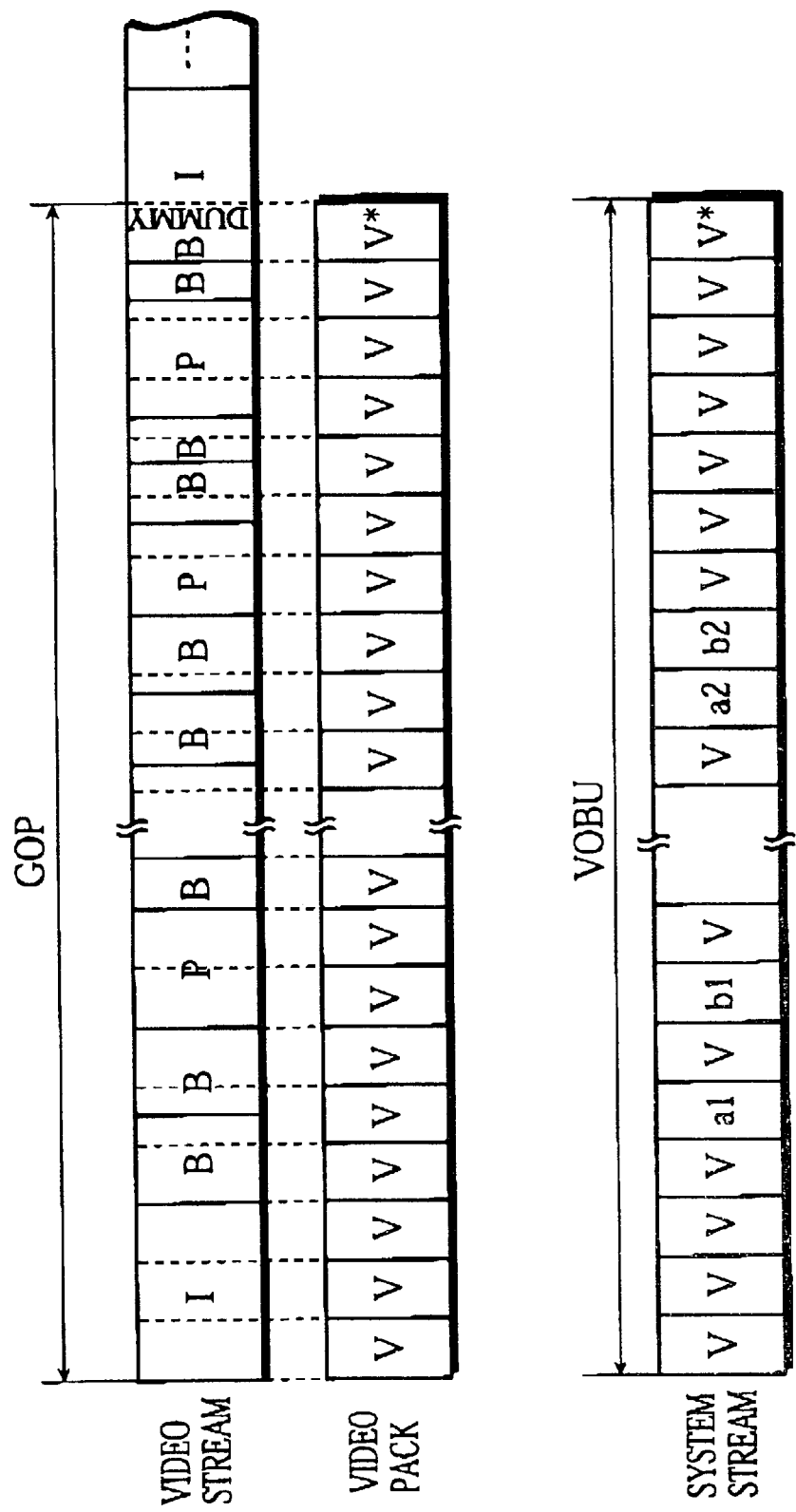
FIG. 18 shows a pack having next start codes.

FIG. 18 shows a pack having next start codes. The video pack ① shown in FIG. 15 includes B-Picture which is the last Picture of the GOP. Accordingly, next start codes as dummy data are packed in the remaining space of the pack.

The next start codes are stored in the video buffer of the decoder. As a result, the video encoder, not the system encoder, generates the dummy data. With this construction, the video encoder can accurately recognize the occupied amount of the video buffer. This prevents generation of such pictures as cause the video buffer to generate an overflow or underflow.

Brief Account

As described above, the DVD recorder of the present embodiment inserts next start codes in the pack that includes the last Picture of one GOP. This easily prevents a Picture of a GOP belonging to the next VOBU from being inserted in a pack of the preceding VOBU.

Embodiment 4

Embodiment 4 relates to a DVD recorder which exercises control so that audio frames belonging to different audio channels belong to the same VOBU when they have the same PTS.

Construction

The DVD recorder of the present embodiment is the same as that of Embodiment 1 except the system encoder 207. The following is the description of a function unique to the present embodiment which is realized by the system encoder 207.

The system encoder 207 arranges packs of audio frames having the same PTS to be successive on the system stream. More specifically, the system encoder 207 generates packs of audio frames when the difference between the PTS and the current SCR is lower than a certain value $\alpha$. For two audio frames respectively generated from different channels and having the same PTS, when one of them is lower than the value $\alpha$ and is inserted into a pack, the other audio frame is definitely lower than the value α in the next round of pack generation. Accordingly, the other audio frame is inserted into the next pack. With this construction, the packs of these two audio frames are arranged to be successive on the system stream.

Figure 19:
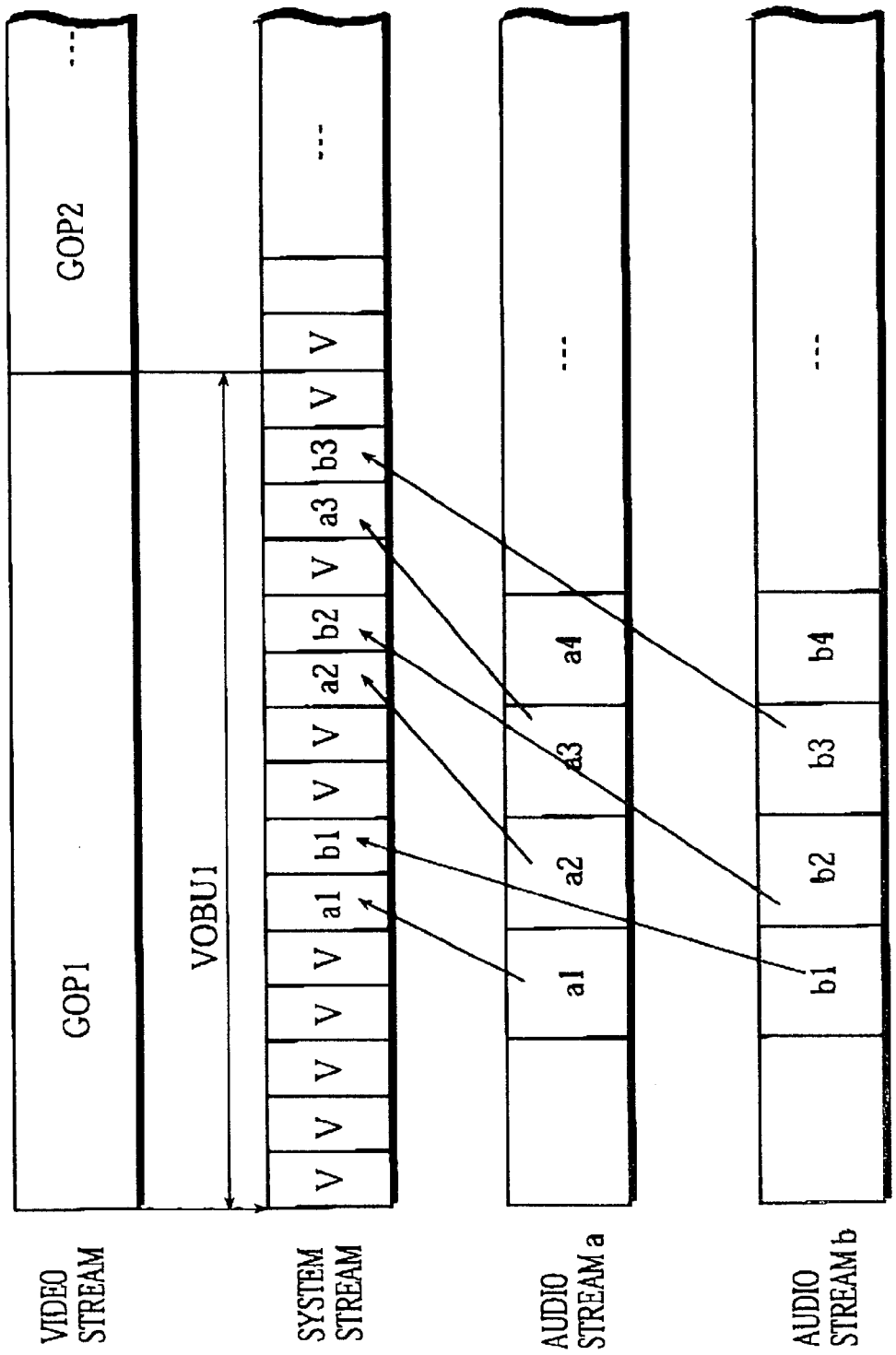
FIG. 19 shows packs of audio frames including the same PTS having been arranged to be successive.

FIG. 19 shows packs of audio frames including the same PTS having been arranged to be successive. As shown in FIG. 19, a1 and b1, a2 and b2, and a3 and b3 have the same PTS, respectively. As a result, these packs are arranged to be successive.

Operation

Figure 20:
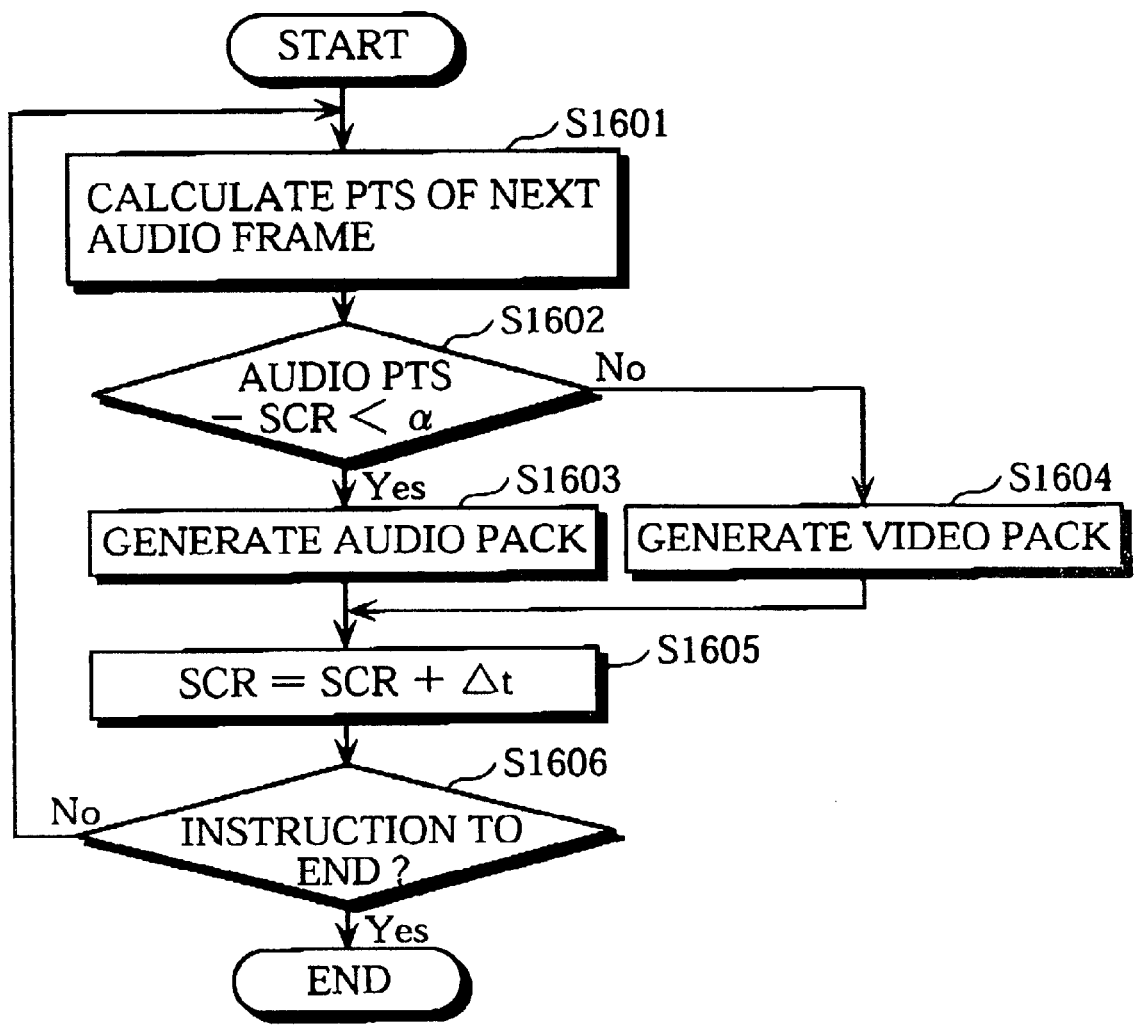
FIG. 20 is a flowchart showing the multiplexing operation procedure.

FIG. 20 is a flowchart showing the multiplexing operation procedure of the present embodiment.

First, the system encoder 207 calculates the PTS of the audio frame to be the next audio pack. The audio frame includes a reproduction time, where the reproduction times assigned to the audio frames in order differ by a regular period. As a result, the system encoder 207 obtains the PTS by multiplying the frame number with the period (step S1601).

Secondly, the system encoder 207 compares the calculated PTS with the SCR to be written into the next pack. When the difference between the calculated PTS and the SCR is lower than the certain value α, the system encoder 207 generates an audio pack from the audio frame, and writes the PTS and the SCR to the header of the pack (steps S1602, S1603).

When the difference between the calculated PTS and the SCR is equal to or more than the certain value α, the system encoder 207 judges that the next audio frame cannot be multiplexed yet, and generates a video pack from the video stream (step S1604).

The system encoder 207 then adds a certain time Δt to the current SCR to update the SCR (step S1605).

The system encoder 207 ends the process of generating the system stream when receiving an instruction to end the process. Otherwise, the system encoder 207 repeats the steps S1601 to S1605 (step S1606)

Brief Account

As described above, the DVD recorder of the present embodiment easily arrange a plurality of audio frames belonging to different channels and having the same PTS as successive packs on the system stream.

Variations

The present invention is not limited to the above embodiments, but can be varied as follows, for example.

(1) In Embodiment 1, it is judged whether the value (j−k) is equal to or higher than n each time a pack having Pictures is generated. However, the judgement may be performed each time a Picture is inserted into a pack More specifically, the number of Pictures j is incremented and it is judged whether the value (j−k) has reached n each time a Picture is newly inserted into a pack. When it is judged positively, the remaining space of the current pack is filled with dummy data, and the current SCR is written into the pack header. With regards to the next pack, SCR to be written into the pack may be adjusted in the same way as Embodiment 1.

(2) In Embodiment 2, SCR to be written into the packs is adjusted, and the number of Pictures is limited to a certain number or lower. However, only the adjustment of SCR may be performed.

Figure 21:
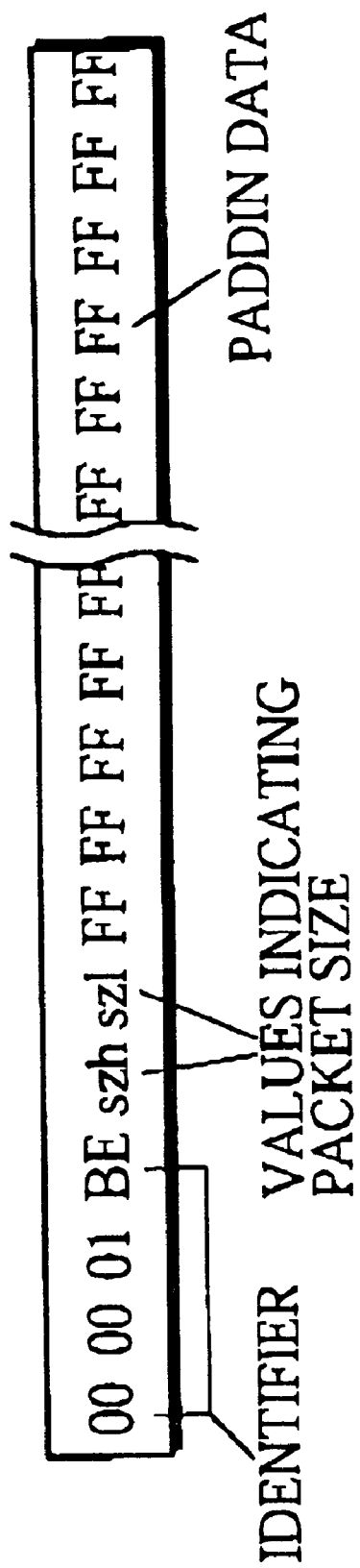
FIG. 21 shows padding stream packets.

(3) In Embodiment 2, the "next start codes" are used as dummy data. However, padding stream packets shown in FIG. 21 may be used. The padding stream packets are generated by the system encoder, not by the video encoder. That is to say, when the number of Pictures stored in a pack has reached a predetermined number, the system encoder stops storing the next Picture data into the pack, and instead stores the padding stream packets into the pack. The Picture data not stored in the pack may be stored in a newly generated pack.

(4) In Embodiment 4, a plurality of audio frames belonging to different channels and having the same PTS are arranged as successive packs on the system stream based on the difference between the SCR and the PTS. This can also be achieved by making it a rule that whenever an audio frame is stored in a pack, the next pack stores another audio frame with the same PTS.

(5) In Embodiment 4, the PTS is calculated by multiplying the frame number of the audio frame with the period. However, the PTS may be determined beforehand for each audio frame.

(6) In Embodiment 1, to generate system streams conforming to the "one-second rule", predetermined value n of the system is set to 29 or lower when the video frame cycle is 33.3667 msec. However, the predetermined value n of the system may be set to 1/T when the video frame cycle is T seconds.

(7) In Embodiment 2, FGrid is a multiple of 33.3667 msec (video frame cycle). However, the FGrid time may be set to a multiple of a slice cycle (1/30 of the video frame cycle), where a frame includes 30 slices.

The present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. A system stream creating apparatus for creating a system stream, the system stream being a sequence of fixed-length packs, each pack storing a piece of video stream data, the video stream data being a sequence of picture data, said system stream creating apparatus comprising:

a stream data transfer unit operable to extract a piece of picture data having a size of a payload from the video stream data and store the piece of picture data into a fixed-length pack;

a header data generating unit operable to write a specified time in a header of the pack storing the piece of picture data, the specified time indicating a time when the piece of picture data of the pack is to be input to a video decoder buffer of a decoding apparatus;

a condition judging unit operable to judge, when said header data generating unit writes the specified time, whether a difference between (1) a total number of pieces of picture data to be stored in the video decoder buffer up to the specified time and (2) a total number of pieces of picture data to be decoded by the decoding apparatus up to a unit time before the specified time has reached a predetermined value;

a time updating unit operable to update the specified time; and a stop/resume control unit operable to, when said condition judging unit judges that the difference has reached the predetermined value, cause said header data generating unit not to write the specified time and cause said stream data transfer unit to stop storing the piece of video stream data, and when having caused said header data generating unit not to write and having caused said stream data transfer unit to stop storing, cause said time updating unit to update the specified time and cause said condition judging unit to judge whether the difference calculated using the updated specified time has reached the predetermined value, and when the condition judging unit makes the judgement negatively, cause said header data generating unit to write the specified time and cause said stream data transfer unit to resume storing the piece of video stream data.

2. A system stream creating apparatus for creating a system stream, the system stream being a sequence of fixed-length packs, each pack storing a piece of video stream data, the video stream data being a sequence of picture data, said system stream creating apparatus comprising:

a stream data transfer unit operable to extract a piece of picture data having a size of a payload from the video stream data stored in a video buffer and store the piece of picture data into a fixed-length pack;

a header data generating unit operable to write a specified time in a header of the pack storing the piece of picture data, the specified time indicating a time when the piece of picture data of the pack is to be input to a video decoder buffer of a decoding apparatus;

a condition judging unit operable to judge, when a piece of picture data having a size of payload is extracted from the video buffer and stored into a fixed-length pack, whether an amount of data stored in the video buffer would be lower than or equal to a predetermined value if the piece of picture data having the size of payload were stored into the video buffer, using a model of change in the amount of data stored in the video buffer, the model being made on an assumption that picture data is input to the video buffer every certain time and a piece of picture data included in each pack is output from the video buffer at a specified time written in a header of each pack;

a time updating unit operable to update the specified time; and a stop/resume control unit operable to, when said condition judging unit judges that the amount of data would be lower than or equal to the predetermined value, cause said header data generating unit not to write the specified time and cause said stream data transfer unit to stop storing the piece of picture data, and when having caused said header data generating unit not to write and having caused said stream data transfer unit to stop storing, cause said time updating unit to update the specified time and cause said condition judging unit to judge whether the amount of data stored in the video buffer would be lower than or equal to the predetermined value, and when said condition judging unit judges that the amount of data would exceed the predetermined value, cause said header data generating unit to write the specified time and cause said stream data transfer unit to resume storing the piece of picture data.

3. The system stream creating apparatus of claim 2, wherein the certain time is a video frame cycle or a slice cycle.

4. The system stream creating apparatus of claim 3, further comprising:

a picture number judging unit operable to judge, when said stream data transfer unit stores a next piece of picture data into the pack, whether a total number of pieces of picture data in the pack has reached a predetermined number; and a transfer control unit operable to, when said picture number judging unit has judged positively, cause said stream data transfer unit to stop storing the next piece of picture data and store dummy data into the pack.

5. The system stream creating apparatus of claim 4, wherein said transfer control unit is further operable to cause said stream data transfer unit to store the next piece of picture data into another pack.

6. The system stream creating apparatus of claim 5, further comprising:

a video encoding unit operable to generate picture data by compressing a video signal when said picture number judging unit has judged negatively, and generating as many next start codes as correspond to remaining space of the pack as the dummy data when said picture number judging unit has judged positively, wherein said stream data transfer unit is operable to store either the picture data or the next start codes generated by said video encoding unit into the pack.

7. A system stream creating method for creating a system stream, the system stream being a sequence of fixed-length packs, each pack storing a piece of video stream data, the video stream data being a sequence of picture data, said system stream creating method comprising:

extracting a piece of picture data having a size of a payload from the video stream data and storing the piece of picture data into a fixed-length pack;

judging, when a specified time, which indicates a time when the piece of picture data stored in a pack is to be input to a video decoder buffer of a decoding apparatus, is written in a header of the pack storing the piece of picture data, whether a difference between (1) a total number of pieces of picture data to be stored in the video decoder buffer up to the specified time and (2) a total number of pieces of picture data to be decoded by the decoding apparatus up to a unit time before the specified time has reached a predetermined value;

writing the specified time into the pack storing the piece of picture data when it is judged in said judging that the difference has not reached the predetermined value; and updating, when it is judged in said judging that the difference has reached the predetermined value, the specified time, judging whether a difference between (1) a total number of pieces of picture data to be stored in the video decoder buffer up to the updated specified time and (2) a total number of pieces of picture data to be decoded by the decoding apparatus up to a unit time before the updated specified time has reached the predetermined value, and when the judgement of the difference is made negatively, writing the updated specified time into the pack storing the piece of picture data.

8. A system stream creating method for creating a system stream, the system stream being a sequence of fixed-length packs, each pack storing a piece of video stream data, the video stream data being a sequence of picture data, said system stream creating method comprising:

judging, when a piece of picture data having a size of payload is extracted from the video stream data in a video buffer and stored into a fixed-length pack, whether an amount of data stored in the video buffer would be lower than or equal to a predetermined value if the piece of picture data having the size of payload were stored into the video buffer, using a model of change in the amount of data stored in the video buffer, the model being made on an assumption that picture data is input to the video buffer every certain time and a piece of picture data included in each pack is output from the video buffer at a specified time written in a header of each pack;

updating, when said judging judges that the amount of data would exceed the predetermined value, a time when the piece of picture data is to be input to a video decoder buffer of a decoding apparatus and judging whether the amount of data stored in the video buffer would be lower than or equal to the predetermined value;

storing, when either said judging whether an amount of data stored in the video buffer would be lower than or equal to a predetermined value if the piece of picture data having the size of payload were stored into the video buffer or when said updating and judging whether the amount of data stored in the video buffer would be lower than or equal to the predetermined value judges that the amount of data would be lower than or equal to the predetermined value, the piece of picture data into the pack, and writing a specified time into a header of the pack storing the piece of picture data based on a time when the piece of picture data is extracted from the video buffer, the specified time indicating a time when the piece of picture data is to be input to the video decoder buffer.

9. A system stream creating method for creating a system stream, the system stream being a sequence of fixed-length packs, each pack storing a piece of either video stream data or audio stream data, the video stream data being a sequence of picture data, the audio stream data being a sequence of audio frames, said system stream creating method comprising:

writing a specified time into a header of a pack, the specified time indicating a time when a piece of picture data or an audio frame included in the pack is to be input to a decoding apparatus;

judging whether a difference between a presentation time of the audio frame and the specified time written in the header of the pack is lower than a certain value; and extracting an audio frame from the audio stream data and storing the extracted audio frame into the pack when said judging makes a positive judgement, and for extracting a piece of picture data having a size of a payload from the video stream data and storing the extracted picture data into the pack when said judging makes a negative judgement.

10. A computer-readable record medium recording a program for creating a system stream, the system stream being a sequence of fixed-length packs, each pack storing a piece of video stream data, the video stream data being a sequence of picture data, the program including computer readable instructions operable to instruct a computer to perform the method comprising:

extracting a piece of picture data having a size of a payload from the video stream data and storing the piece of picture data into a fixed-length pack;

judging, when a specified time, which indicates a time when the piece of picture data stored in a pack is to be-input to a video decoder buffer of a decoding apparatus, is written in a header of the pack storing the piece of picture data, whether a difference between (1) a total number of pieces of picture data to be stored in the video decoder buffer up to the specified time and (2) a total number of pieces of picture data to be decoded by the decoding apparatus up to a unit time before the specified time has reached a predetermined value;

writing the specified time into the pack storing the piece of picture data when it is judged in said judging that the difference has not reached the predetermined value; and updating, when it is judged in said judging that the difference has reached the predetermined value, the specified time, judging whether a difference between (1) a total number of pieces of picture data to be stored in the video decoder buffer up to the updated specified time and (2) a total number of pieces of picture data to be decoded by the decoding apparatus up to a unit time before the updated specified time has reached the predetermined value, and when the judgement of the difference is made negatively, writing the updated specified time into the pack storing the piece of picture data.

11. A computer-readable record medium recording a program for creating a system stream, the system stream being a sequence of fixed-length packs, each pack storing a piece of video stream data, the video stream data being a sequence of picture data, the program including computer readable instructions operable to instruct a computer to perform the method comprising:

judging, when a piece of picture data having a size of payload is extracted from the video stream data in a video buffer and stored into a fixed-length pack, whether an amount of data stored in the video buffer would be lower than or equal to a predetermined value if the piece of picture data having the size of payload were stored into the video buffer, using a model of change in the amount of data stored in the video buffer, the model being made on an assumption that picture data is input to the video buffer every certain time and a piece of picture data included in each pack is output from the video buffer at a specified time written in a header of each pack;

updating, when said judging judges that the amount of data would exceed the predetermined value, updating a time when the piece of picture data is to be input to a video decoder buffer of a decoding apparatus and judging whether the amount of data stored in the video buffer would be lower than or equal to the predetermined value;

storing, when either said judging whether an amount of data stored in the video buffer would be lower than or equal to a predetermined value if the piece of picture data having the size of payload were stored into the video buffer or said updating and judging whether the amount of data stored in the video buffer would be lower than or equal to the predetermined value judges that the amount of data would be lower than or equal to the predetermined value, the piece of picture data into the pack, and writing a specified time into a header of the pack storing the piece of picture data based on a time when the piece of picture data is extracted from the video buffer, the specified time indicating a time when the piece of picture data is to be input to the video decoder buffer.

12. A computer-readable record medium recording a program for creating a system stream, the system stream being a sequence of fixed-length packs, each pack storing a piece of either video stream data or audio stream data, the video stream data being a sequence of picture data, the audio stream data being a sequence of audio frames, the program including computer readable instructions operable to instruct a computer to perform the method comprising:

writing a specified time into a header of a pack, the specified time indicating a time when a piece of picture data or an audio frame included in the pack is to be input to a decoding apparatus;

judging whether a difference between a presentation time of the audio frame and the specified time written in the header of the pack is lower than a certain value; and extracting an audio frame from the audio stream data and storing the extracted audio frame into the pack when said judging makes a positive judgement, and for extracting a piece of picture data having a size of a payload from the video stream data and storing the extracted picture data into the pack when said judging makes a negative judgement.

13. A system stream creating apparatus for creating a system stream, the system stream being a sequence of fixed-length packs, each pack storing a piece of video stream data, the video stream data being a sequence of picture data, said system stream creating apparatus comprising:

a stream data transfer unit operable to extract a piece of picture data having a size of a payload from the video stream data and store the piece of picture data into a fixed-length pack;

a decoding apparatus operable to decode one piece of picture data every video frame cycle, said decoding apparatus including a video recorder buffer;

a header data generating unit operable to write a specified time in a header of the pack storing the piece of picture data, the specified time indicating a time when the piece of picture data of the pack is to be input to said video decoder buffer of said decoding apparatus;

a condition judging unit operable to judge, when said header data generating unit writes the specified time, whether a difference between (1) a total number of pieces of picture data to be stored in the video decoder buffer up to the specified time and (2) a total number of pieces of picture data to be decoded by the decoding apparatus up to a unit time before the specified time has reached a predetermined value;

a time updating unit operable to update the specified time; and a stop/resume control unit operable to, when said condition judging unit judges that the difference has reached the predetermined value, cause said header data generating unit not to write the specified time and cause said stream data transfer unit to stop storing the piece of video stream data, and when having caused said header data generating unit not to write and having caused said stream data transfer unit to stop storing, cause said time updating unit to update the specified time and cause said condition judging unit to judge whether the difference calculated using the updated specified time has reached the predetermined value, and when the condition judging unit makes the judgement negatively, cause said header data generating unit to write the specified time and cause said stream data transfer unit to resume storing the piece of video stream data, wherein the unit time is one second, and wherein the predetermined value is lower than a result of a division of one second by one video frame cycle.

14. A recorder system comprising:

a system stream creating apparatus operable to create a system stream, the system stream being a sequence of fixed-length packs, each pack storing a piece of video stream data, the video stream data being a sequence of picture data, said system stream creating apparatus comprising a stream data transfer unit, a header data generating unit, a decoding apparatus including a video recorder buffer, a condition judging unit, a time updating unit and a stop/resume control unit; and a recording apparatus operable to record a system stream generated by said system stream creating apparatus onto a record medium, wherein said stream data transfer unit is operable to extract a piece of picture data having a size of a payload from the video stream data and store the piece of picture data into a fixed-length pack, wherein said decoding apparatus is operable to decode one piece of picture data every video frame cycle, wherein said header data generating unit is operable to write a specified time in a header of the pack storing the piece of picture data, the specified time indicating a time when the piece of picture data of the pack is to be input to said video decoder buffer of said decoding apparatus, wherein said condition judging unit is operable to judge, when said header data generating unit writes the specified time, whether a difference between (1) a total number of pieces of picture data to be stored in the video decoder buffer up to the specified time and (2) a total number of pieces of picture data to be decoded by the decoding apparatus up to a unit time before the specified time has reached a predetermined value, wherein said time updating unit is operable to update the specified time, and wherein said stop/resume control unit is operable to, when said condition judging unit judges that the difference has reached the predetermined value, cause said header data generating unit not to write the specified time and cause said stream data transfer unit to stop storing the piece of video stream data, and when having caused said header data generating unit not to write and having caused said stream data transfer unit to stop storing, cause said time updating unit to update the specified time and cause said condition judging unit to judge whether the difference calculated using the updated specified time has reached the predetermined value, and when the condition judging unit makes the judgement negatively, cause said header data generating unit to write the specified time and cause said stream data transfer unit to resume storing the piece of video stream data, wherein the unit time is one second, and wherein the predetermined value is lower than a result of a division of one second by one video frame cycle.

15. The recorder system of claim 14, further comprising:

a reading apparatus operable to read the system stream from the record medium; and a second decoding apparatus operable to decode the system stream read by said reading apparatus.

* * * * *